United States Patent
Kalou et al.

(10) Patent No.: US 12,223,340 B2
(45) Date of Patent: Feb. 11, 2025

(54) SYSTEMS AND METHODS TO IMPLEMENT MICROAPPS IN DIGITAL WORKSPACES

(71) Applicant: Citrix Systems, Inc., Fort Lauderdale, FL (US)

(72) Inventors: Aikaterini Kalou, Patras (GR); Abirami Sukumaran, Bangalore (IN)

(*) Notice: Subject to any disclaimer, the term of this patent is extended or adjusted under 35 U.S.C. 154(b) by 661 days.

(21) Appl. No.: 17/375,410

(22) Filed: Jul. 14, 2021

(65) Prior Publication Data
US 2022/0357977 A1 Nov. 10, 2022

Related U.S. Application Data

(63) Continuation of application No. PCT/GR2021/000026, filed on May 5, 2021.

(51) Int. Cl.
*G06F 9/46* (2006.01)
*G06F 9/451* (2018.01)
*G06F 11/30* (2006.01)
*G06F 11/34* (2006.01)
*G06N 20/00* (2019.01)

(52) U.S. Cl.
CPC ............... *G06F 9/46* (2013.01); *G06F 9/451* (2018.02); *G06F 11/302* (2013.01); *G06F 11/3438* (2013.01); *G06N 20/00* (2019.01)

(58) Field of Classification Search
CPC ........ G06F 9/46; G06F 9/451; G06F 11/3438; G06N 20/00
See application file for complete search history.

(56) References Cited

U.S. PATENT DOCUMENTS

| | | | |
|---|---|---|---|
| 2013/0204825 A1* | 8/2013 | Su | G06N 5/02 706/46 |
| 2014/0052696 A1* | 2/2014 | Soroushian | H04N 21/482 707/736 |
| 2017/0024717 A1 | 1/2017 | Istrati | |
| 2019/0065177 A1 | 2/2019 | Khoongumjorn et al. | |
| 2020/0106842 A1 | 4/2020 | Chauhan | |
| 2020/0404573 A1 | 12/2020 | Athlur et al. | |

OTHER PUBLICATIONS

International Search Report and Written Opinion on PCT Appl. No. PCT/GR2021/000026 mailed Jan. 20, 2022.

* cited by examiner

*Primary Examiner* — Wissam Rashid

(57) ABSTRACT

Described embodiments provide systems and methods for enhancing user engagement with micro applications. A computing device can include one or more processors and memory. The computing device can receive an indication of an action to be completed with use of a micro application. The computing device can be in communication with a client device and one or more computing systems of record to execute the micro application. The computing device can identify values for one or more attributes of the micro application. The computing device can generate, based on the identified values, a score for the micro application. The computing device can provide the score to the client device for display within a user interface. The user interface can be configured to initiate the action with use of the micro application.

18 Claims, 14 Drawing Sheets

| Overview | Manage | Points |
|---|---|---|

600

604

Integration: ✱
Microapp: ✱
Short Description: ✱
Target Persona: ✱
No. of open issues? ✱ ✻
Microapp Type ✱
No. of action buttons? ✱
No. of notifications? ✱
Does the usecase workflow include reviews? ✱
Number of user inputs expected: ✱
Rate expected user effort (1-least, 5-highest): ✱ ✻
Number of dependencies (systems/teams): ✱
Rate end user relevance (1-least, 5-highest) ✻
Rate business impact (1-least, 5-highest) ✻
Expected to match SoR/required Look & Feel: ✱ ✻
Do you expect users to be trained for usage? ✻
Expected number of users? (Numeric)
Expected transactions in a day average (Numeric) ✻
Expected time-save per transaction in Seconds ✻

Broadcast
Announcements — Champions Only
This is to send announcements to Workspace Champions
All
0
Both
2
2
Yes
5
1
0
1
1
Yes
Yes
123
8800
23

[Calculate] — 612

608

Points:
2
616

✱ Design Component
✻ Use Case Input

FIG. 6

SYSTEMS AND METHODS TO IMPLEMENT MICROAPPS IN DIGITAL WORKSPACES

CROSS-REFERENCE TO RELATED APPLICATIONS

This application is a continuation of, and claims priority to and the benefit of International Patent Application No. PCT/GR2021/000026, titled "SYSTEMS AND METHODS TO IMPLEMENT MICROAPPS IN DIGITAL WORKSPACES", and filed on May 5, 2021, the entire contents of which are hereby incorporated herein by references in its entirety for all purposes.

FIELD OF THE DISCLOSURE

The present application generally relates to managing applications within digital workspaces, including but not limited to systems and methods for use of micro applications.

BACKGROUND

A digital workspace is an integrated technology framework designed to deliver and manage applications, data, and desktop delivery. Users can access their applications and data in real-time using the digital workspace. Digital workspaces have been leveraged across different industries and organizations to provide unified applications and data for delivery to users. As more companies adopt digital workspaces for their daily tasks, there are significant challenges to the companies in maintaining or improving the engagement of users in using the digital workspaces.

SUMMARY

This Summary is provided to introduce a selection of concepts in a simplified form that are further described below in the Detailed Description. This Summary is not intended to identify key features or essential features, nor is it intended to limit the scope of the claims included herewith.

Digital Workspaces have transformed how industries and organizations operate. Conventional digital workspace, such as aggregations or pools of applications or desktops, can unify access to applications ("apps") and data. However, conventional digital workspace alone may not be enough to satisfy the needs and expectations of the users of the digital workspace, as some may be disengaged due to context-switching, searching application details, passwords, among other collective features piled into the digital workspace. Hence, by introducing micro applications ("microapps") within digital workspaces (e.g., Citrix Workspace), these microapps can reduce context-switching and eliminate the need to learn how to use various applications. Microapps can allow for core functionalities of each application to be brought together in one place. Microapps service can be included in the Intelligent Workspace features for a workspace that gives users a single unified experience with notifications, actions, and workflows to guide and automate work that is, for example, a part of Software as a Service ("SaaS"), legacy, and homegrown applications. Although with the introduction of microapps in workspaces, it is still challenging to motivate users to adopt and use microapps within the workspace due to one or more barriers (e.g., time investment for learning new interfaces and navigations, unapparent benefits from the transition, or unfamiliarity with new platform), thereby delaying improvement to user experience and productivity of the task at hand.

The systems and methods of this technical solution can assign scores to microapps and prioritize microapps based on at least the functionalities of a microapp, the identity of the user, among others, to improve experience and productivity of the user and enhance user engagement with the microapp, thereby increasing the adoption rate of microapps. The digital workspace can include at least a point scoring system, competition among users, rewards (e.g., based on points earned by one or more users), difficulty levels, and rule settings to increase motivation and engagement of users when using microapps. Further, users can be acknowledged or recognized for everyday tasks based on their accumulated scores.

Workspace microapps products can simplify tasks and improve the experience and productivity of users. However, unless the workspace microapps are used to complete day-to-day work wherever applicable, end-users will be less likely to adopt and actively use microapps. Therefore, to facilitate the usage of the workspace microapps, the system and methods can prioritize one or more microapps (e.g., core functionalities or tasks of a microapp) by assigning scores. The systems and methods can identify the microapps that should be completed within a time frame and dynamically increase their score, such as to encourage users to utilize the microapps. Based on the priority of the microapps, a microapp can be launched (e.g., automatically launched) for a user to complete. With the daily usage of microapps throughout day-to-day work, user experience can be improved by reducing application launch/access time (e.g. by prefetching components or data, invisibly launching the application, etc.) and/or enhancing application organization (e.g., by prioritizing microapps in a user interface in order of predicted use so that a user doesn't need to search for the app that they are most likely to access). As such, the systems and methods can facilitate a score-oriented experience in workspace microapps by intelligently point-scoring actions and usages of microapps for each user and rewarding them appropriately based on users' ranking or collected scores.

The systems and methods of this technical solution can be employed in any area as individual applications, such as in learning, healthcare, or fitness applications. The systems and methods can translate and scale the point-scoring mechanics to a workspace microapps type environment with intelligent scoring and analytics capability (e.g., to monitor and determine user actions and assign scores accordingly). The systems and methods can identify a task (e.g., managed by a microapp) that should be prioritized and dynamically increase its point total to encourage users to perform the task. Based on the priority, the systems and methods can launch a microapp for the user to complete a high-priority task, for example. Thus, the technical solution described herein can increase the efficiency of launching microapps within a workspace using point-scoring features and mechanics and decrease resource consumption for the workspace via prioritization of a microapp for the user to complete, thereby reducing multiple instantiations of the microapp to complete the task. Further, with features to predict which microapp the user is likely to launch (e.g., based on the priority or score associated with microapps), the technical solution provided by the systems and methods discussed herein can improve access time to the microapp (e.g., reducing the time to launch a desired microapp or access data within the microapp) and avoid falsely instantiating other applications the user may not access.

In one aspect, the present disclosure provides systems and methods for enhancing user engagement with micro applications. A computing device can include one or more processors and memory to manage the digital workspace. The computing device can be a remote device, a server, or a cloud computing device, for example. The digital workspace can include, manage, or otherwise be in sync with one or more microapps. The computing device can be in communication with one or more client devices or other servers via a network interface. The computing device can receive a request from the client device to access a microapp. Subsequent to the request, the computing device can identify values for one or more adjustable variables of the microapp. The values can be adjusted by a developer or administrator of the workspace, for example. The computing device can generate a score associated with the microapp requested by the client device. The generated score can be based on the values for the one or more adjustable variables for the microapp. The computing device can assign the generated score to the microapp, such that the client device can obtain the score from one or more actions, such as completing at least a part of the task of the microapp.

The computing device can provide the microapp to the client device responsive to receiving the request to access the microapp. The client device can display the microapp on a display device of the client device. In some cases, based on the priority of the microapp (e.g., determined by the computing device based on the values of the adjustable variables), the computing device can automatically launch or store microapp data prior to the user requesting a microapp. The computing device can monitor activities performed by the client device with the microapp. The activities can include interactions with components within the microapp, such as scrolling through files/documents (e.g., a user reviewing documents), keypresses, mouse click, submission of completed tasks, among others.

In one aspect, this disclosure is directed to a method for enhancing user engagement with micro applications. The method can include receiving, by a computing device comprising one or more processors and memory, an indication of an action to be completed with use of a micro application. The computing device can be in communication with a client device and one or more computing systems of record to execute the micro application. The method can include identifying, by the computing device, values for one or more attributes of the micro application. The method can include generating, by the computing device, based on the identified values, a score for the micro application. The method can include providing, by the computing device, the score to the client device for display within a user interface, the user interface configured to initiate the action with use of the micro application.

The method can include monitoring, by the computing device, the use of the micro application for an activity of the client device. The method can include determining, by the computing device, that the activity of the client device with the micro application satisfies an activity threshold. The method can include incrementing, by the computing device, responsive to satisfying the activity threshold, a counter displayed within the user interface by at least a portion of the generated score for the micro application. The method can include receiving, by the computing device, a request to terminate the micro application. The method can include determining, by the computing device, that an activity performed by the client device do not satisfy an activity threshold. The method can include transmitting, by the computing device, responsive to the activity not satisfying the activity threshold, a notification indicating that the client device did not obtain at least a portion of the generated score for the micro application.

The method can include providing, by the computing device, to the client device, an interface comprising the one or more attributes for the micro application. The method can include receiving, by the computing device from the client device, the values for the one or more attributes of the micro application. The method can include generating, by the computing device, the values for the one or more attributes for the micro application based on a log of historical use of the micro application by one or more client devices. Generating the values for the one or more attributes and generating the score for the micro application is performed at a first time. The method can include receiving, by the computing device, a request from a second client device to access the micro application. The method can include generating, by the computing device at a second time, values for the one or more attributes for the micro application, at least one of the values generated at the second time different from at least one of the corresponding values generated at the first time. The method can include generating, by the computing device at the second time, a second score for the micro application, the second score different from the score generated at the first time. The method can include providing, by the computing device, the generated second score to the second client device for display within a second user interface of the second client device. The second user interface can be configured to initiate a different action with use of the micro application.

The method can include generating, by the computing device, a corresponding subscore for each of the one or more attributes of the micro application. The method can include identifying, by the computing device, a plurality of activity thresholds, each activity threshold associated with a score based on a sum of subscores of the one or more attributes associated with corresponding activities performed with the micro application. The score associated with an activity threshold can be provided to the client device performing activities with the micro application satisfying the activity threshold.

The method can include identifying, by the computing device, a score for each client device of a plurality of client devices. The method can include generating, by the computing device, a list of the plurality of client devices in order according to their respective scores. The method can include training, by the computing device, a machine learning model from a log of historical use of the micro application by one or more client devices and respective scores for the one or more client devices. The method can include determining, by the computing device, using the machine learning model, a weight associated with each of the one or more attributes. The method can include generating, by the computing device based on the weight of each of the one or more attributes, the score associated with the micro application.

In another aspect, this disclosure is directed to a system for enhancing user engagement with micro applications. The system can include a computing device comprising one or more processors in communication with a client device and one or more computing systems of record to execute the micro application. The system can receive an indication of an action to be completed with use of a micro application. The system can identify values for one or more attributes of the micro application. The system can generate, based on the identified values, a score for the micro application. The system can assign the generated score to the micro application. The system can provide the score to the client device for display within a user interface, the user interface configured to initiate the action with use of the micro application.

The system can monitor the use of the micro application for an activity of the client device. The system can determine that the activity of the client device with the micro application satisfies an activity threshold. The system can increment, responsive to satisfying the activity threshold, a counter displayed within the user interface by at least a portion of the generated score for the micro application. The system can receive a request to terminate the micro application. The system can determine that an activity performed by the client device do not satisfy an activity threshold. The system can transmit, responsive to the activity not satisfying the activity threshold, a notification indicating that the client device did not obtain at least a portion of the generated score for the micro application. The system can provide, to the client device, an interface comprising the one or more attributes for the micro application. The system can receive, from the client device, the values for the one or more attributes of the micro application.

The system can generate the values for the one or more attributes for the micro application based on a log of historical use of the micro application by one or more client devices. Generating the values for the one or more attributes and generating the score for the micro application is performed at a first time. The system can receive a request from a second client device to access the micro application. The system can generate, at a second time, values for the one or more attributes for the micro application, at least one of the values generated at the second time different from at least one of the corresponding values generated at the first time. The system can generate, at the second time, a second score for the micro application, the second score different from the score generated at the first time. The system can provide the generated second score to the second client device for display within a second user interface of the second client device, the second user interface configured to initiate a different action with use of the micro application.

The system can generate a corresponding subscore for each of the one or more attributes of the micro application. The system can identify a plurality of activity thresholds, each activity threshold associated with a score based on a sum of subscores of the one or more attributes associated with corresponding activities performed with the micro application. The score associated with an activity threshold can be provided to the client device performing activities with the micro application satisfying the activity threshold. The system can identify a score for each client device of a plurality of client devices. The system can generate a list of the plurality of client devices in order according to their respective scores. The system can train a machine learning model from a log of historical use of the micro application by one or more client devices and respective scores for the one or more client devices. The system can determine, using the machine learning model, a weight associated with each of the one or more attributes. The system can generate, based on the weight of each of the one or more attributes, the score associated with the micro application.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 6 is an example illustration of a workspace microapp adjustable variables, in accordance with one or more implementations;

Figure 1A:
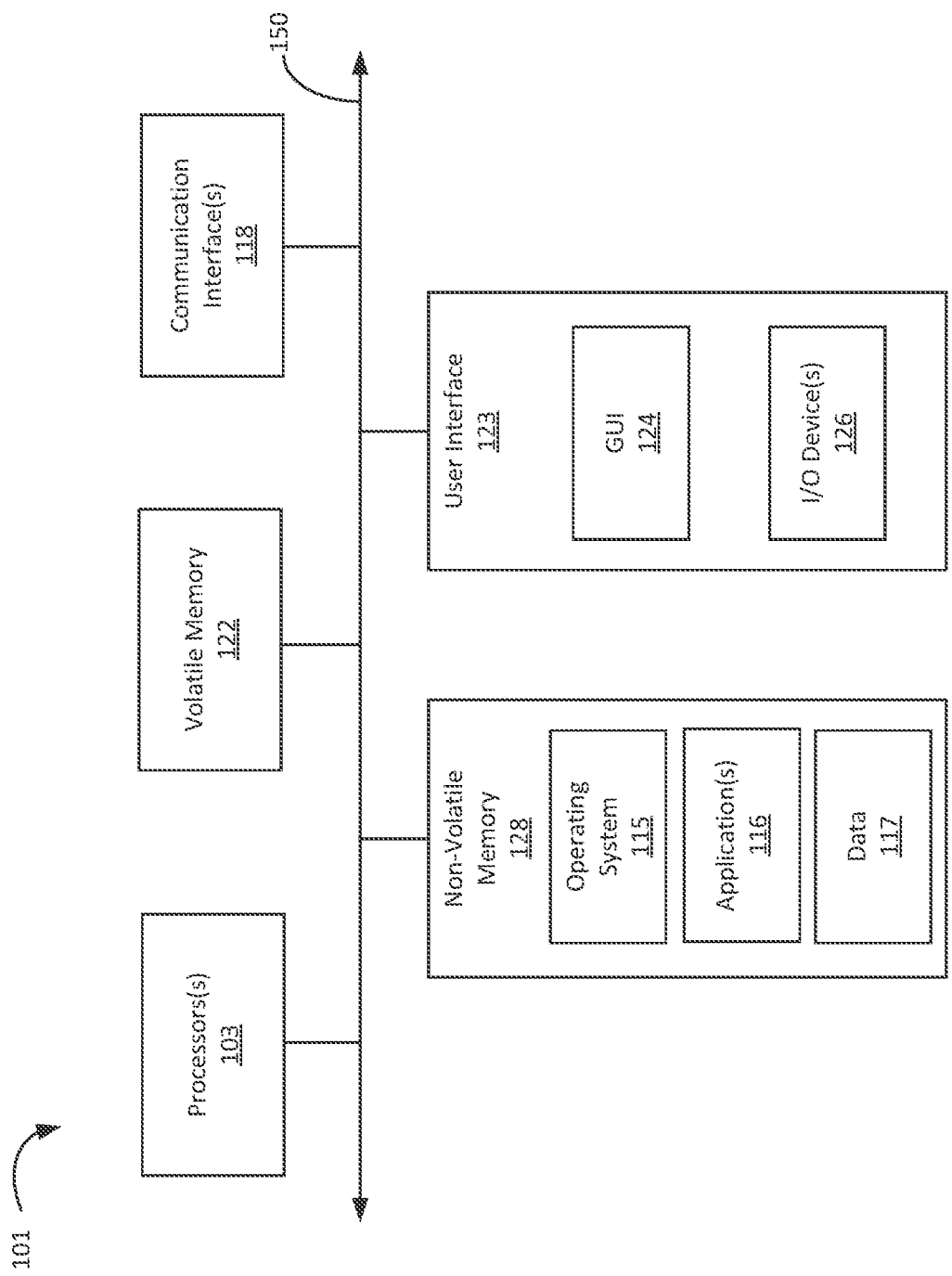
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes resource management services for managing and streamlining access by clients to resource feeds; and Section C describes systems and methods for prioritizing applications within digital workspaces.

A. Computing Environment

Prior to discussing the specifics of embodiments of the systems and methods to implement and enhance the use of microapps in digital environments, it may be helpful to discuss the computing environments in which such embodiments may be deployed.

As shown in FIG. 1A, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, FL, the teachings of which are hereby incorporated herein by reference.

Figure 1B:
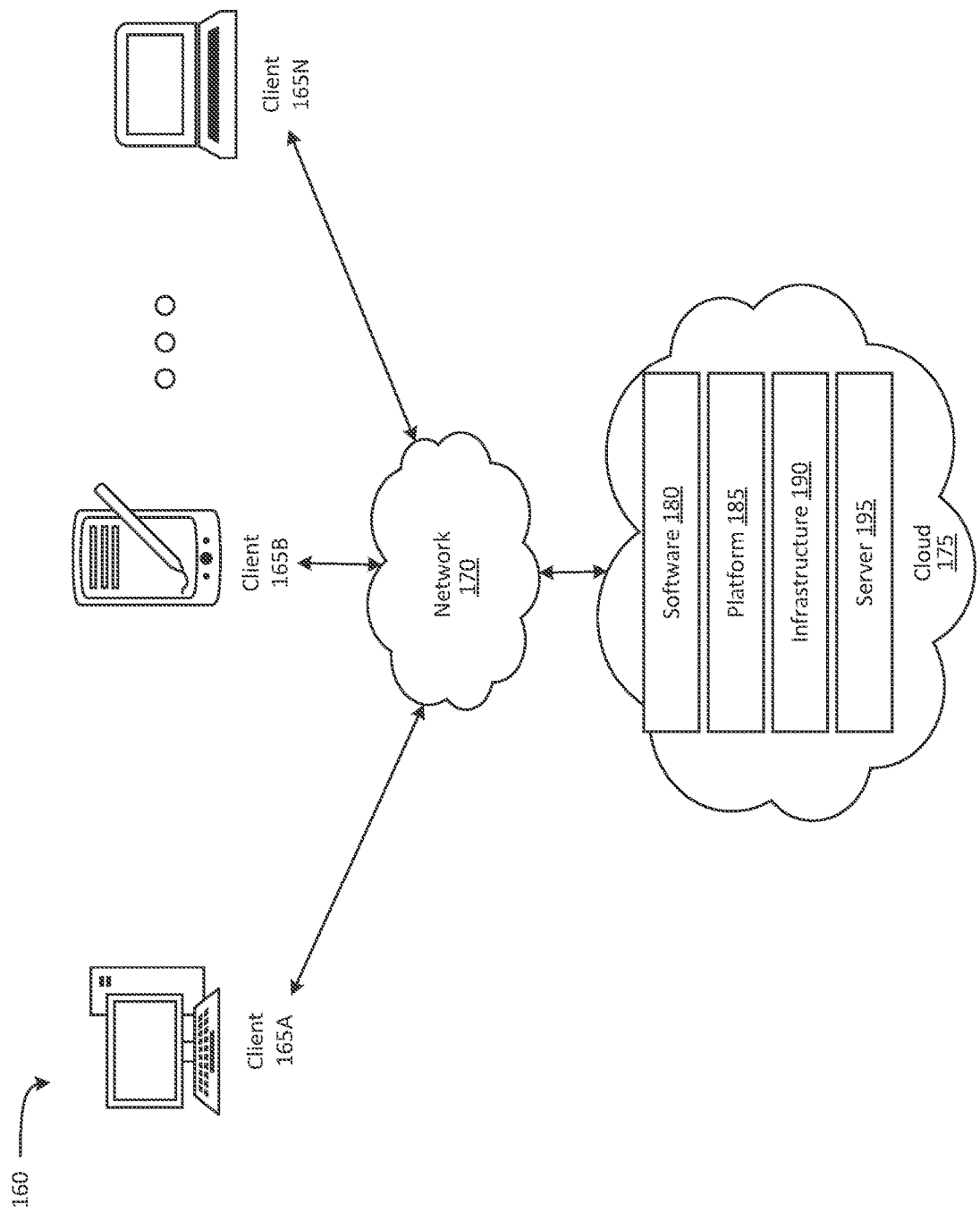
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170. Clients 165 may include, e.g., thick clients, thin clients, and zero clients. The cloud 108 may include back end platforms, e.g., servers, storage, server farms or data centers. The clients 165 can be the same as or substantially similar to computer 101 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 2A:
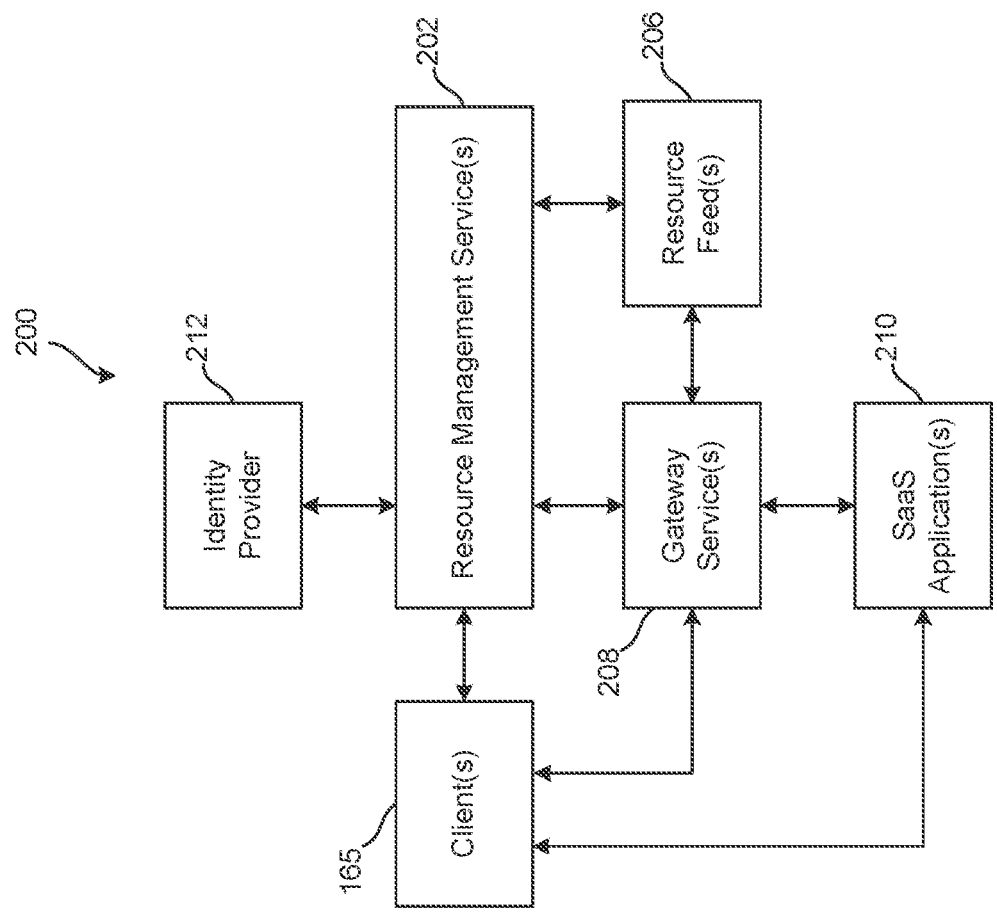
FIG. 2A is a block diagram of an example system in which resource management services may manage and streamline access by clients to resource feeds (via one or more gateway services) and/or software-as-a-service (SaaS) applications.

B. Resource Management Services for Managing and Streamlining Access by Clients to Resource Feeds FIG. 2A is a block diagram of an example system 200 in which one or more resource management services 202 may manage and streamline access by one or more clients 165 to one or more resource feeds 206 (via one or more gateway services 208) and/or one or more software-as-a-service (SaaS) applications 210. In particular, the resource management service(s) 202 may employ an identity provider 212 to authenticate the identity of a user of a client 165 and, following authentication, identify one of more resources the user is authorized to access. In response to the user selecting one of the identified resources, the resource management service(s) 202 may send appropriate access credentials to the requesting client 165, and the client 165 may then use those credentials to access the selected resource. For the resource feed(s) 206, the client 165 may use the supplied credentials to access the selected resource via a gateway service 208. For the SaaS application(s) 210, the client 165 may use the credentials to access the selected application directly.

The client(s) 165 may be any type of computing devices capable of accessing the resource feed(s) 206 and/or the SaaS application(s) 210, and may, for example, include a variety of desktop or laptop computers, smartphones, tablets, etc. The resource feed(s) 206 may include any of numerous resource types and may be provided from any of numerous locations. In some embodiments, for example, the resource feed(s) 206 may include one or more systems or services for providing virtual applications and/or desktops to the client(s) 202, one or more file repositories and/or file sharing systems, one or more secure browser services, one or more access control services for the SaaS applications 210, one or more management services for local applications on the client(s) 202, one or more internet enabled devices or sensors, etc. Each of the resource management service(s) 202, the resource feed(s) 206, the gateway service(s) 208, the SaaS application(s) 210, and the identity provider 212 may be located within an on-premises data center of an organization for which the system 200 is deployed, within one or more cloud computing environments, or elsewhere.

Figure 2B:
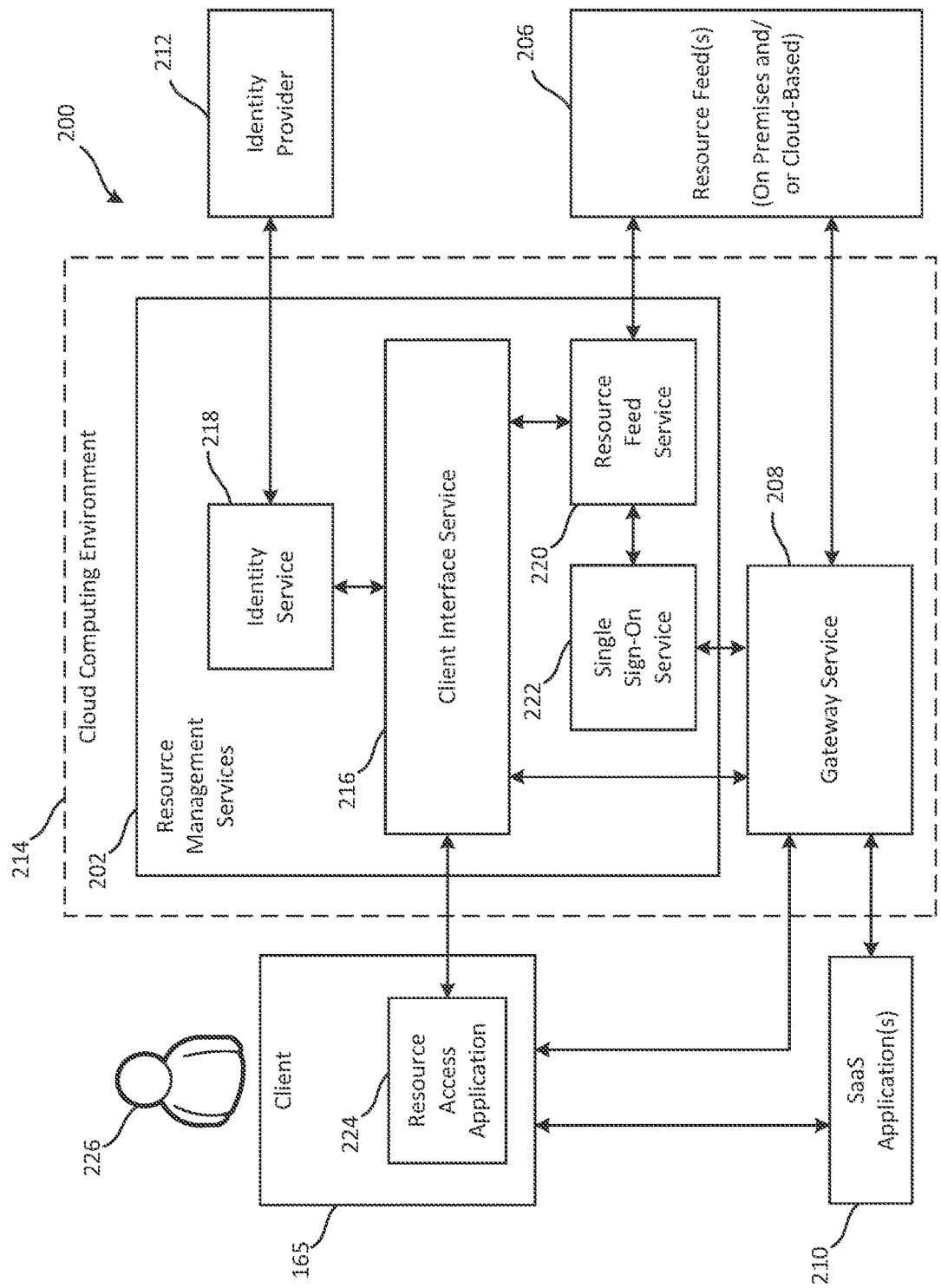
FIG. 2B is a block diagram showing an example implementation of the system shown in FIG. 2A in which various resource management services as well as a gateway service are located within a cloud computing environment.

FIG. 2B is a block diagram showing an example implementation of the system 200 shown in FIG. 2A in which various resource management services 202 as well as a gateway service 208 are located within a cloud computing environment 214. The cloud computing environment may, for example, include Microsoft Azure Cloud, Amazon Web Services, Google Cloud, or IBM Cloud.

For any of illustrated components (other than the client 165) that are not based within the cloud computing environment 214, cloud connectors (not shown in FIG. 2B) may be used to interface those components with the cloud computing environment 214. Such cloud connectors may, for example, run on Windows Server instances hosted in resource locations and may create a reverse proxy to route traffic between the site(s) and the cloud computing environment 214. In the illustrated example, the cloud-based resource management services 202 include a client interface service 216, an identity service 218, a resource feed service 220, and a single sign-on service 222. As shown, in some embodiments, the client 165 may use a resource access application 224 to communicate with the client interface service 216 as well as to present a user interface on the client 165 that a user 226 can operate to access the resource feed(s) 206 and/or the SaaS application(s) 210. The resource access application 224 may either be installed on the client 165, or may be executed by the client interface service 216 (or elsewhere in the system 200) and accessed using a web browser (not shown in FIG. 2B) on the client 165.

As explained in more detail below, in some embodiments, the resource access application 224 and associated components may provide the user 226 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 224 is launched or otherwise accessed by the user 226, the client interface service 216 may send a sign-on request to the identity service 218. In some embodiments, the identity provider 212 may be located on the premises of the organization for which the system 200 is deployed. The identity provider 212 may, for example, correspond to an on-premises Windows Active Directory. In such embodiments, the identity provider 212 may be connected to the cloud-based identity service 218 using a cloud connector (not shown in FIG. 2B), as described above. Upon receiving a sign-on request, the identity service 218 may cause the resource access application 224 (via the client interface service 216) to prompt the user 226 for the user's authentication credentials (e.g., user-name and password). Upon receiving the user's authentication credentials, the client interface service 216 may pass the credentials along to the identity service 218, and the identity service 218 may, in turn, forward them to the identity provider 212 for authentication, for example, by comparing them against an Active Directory domain. Once the identity service 218 receives confirmation from the identity provider 212 that the user's identity has been properly authenticated, the client interface service 216 may send a request to the resource feed service 220 for a list of subscribed resources for the user 226.

In other embodiments (not illustrated in FIG. 2B), the identity provider 212 may be a cloud-based identity service, such as a Microsoft Azure Active Directory. In such embodiments, upon receiving a sign-on request from the client interface service 216, the identity service 218 may, via the client interface service 216, cause the client 165 to be redirected to the cloud-based identity service to complete an authentication process. The cloud-based identity service may then cause the client 165 to prompt the user 226 to enter the user's authentication credentials. Upon determining the user's identity has been properly authenticated, the cloud-based identity service may send a message to the resource access application 224 indicating the authentication attempt was successful, and the resource access application 224 may then inform the client interface service 216 of the successfully authentication. Once the identity service 218 receives confirmation from the client interface service 216 that the user's identity has been properly authenticated, the client interface service 216 may send a request to the resource feed service 220 for a list of subscribed resources for the user 226.

For each configured resource feed, the resource feed service 220 may request an identity token from the single sign-on service 222. The resource feed service 220 may then pass the feed-specific identity tokens it receives to the points of authentication for the respective resource feeds 206. Each resource feed 206 may then respond with a list of resources configured for the respective identity. The resource feed service 220 may then aggregate all items from the different feeds and forward them to the client interface service 216, which may cause the resource access application 224 to present a list of available resources on a user interface of the client 165. The list of available resources may, for example, be presented on the user interface of the client 165 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 165, and/or one or more SaaS applications 210 to which the user 226 has subscribed. The lists of local applications and the SaaS applications 210 may, for example, be supplied by resource feeds 206 for respective services that manage which such applications are to be made available to the user 226 via the resource access application 224. Examples of SaaS applications 210 that may be managed and accessed as described herein include Microsoft Office 365 applications, SAP SaaS applications, Workday applications, etc.

For resources other than local applications and the SaaS application(s) 210, upon the user 226 selecting one of the listed available resources, the resource access application 224 may cause the client interface service 216 to forward a request for the specified resource to the resource feed service 220. In response to receiving such a request, the resource feed service 220 may request an identity token for the corresponding feed from the single sign-on service 222. The resource feed service 220 may then pass the identity token received from the single sign-on service 222 to the client interface service 216 where a launch ticket for the resource may be generated and sent to the resource access application 224. Upon receiving the launch ticket, the resource access application 224 may initiate a secure session to the gateway service 208 and present the launch ticket. When the gateway service 208 is presented with the launch ticket, it may initiate a secure session to the appropriate resource feed and present the identity token to that feed to seamlessly authenticate the user 226. Once the session initializes, the client 165 may proceed to access the selected resource.

When the user 226 selects a local application, the resource access application 224 may cause the selected local application to launch on the client 165. When the user 226 selects a SaaS application 210, the resource access application 224 may cause the client interface service 216 request a one-time uniform resource locator (URL) from the gateway service 208 as well a preferred browser for use in accessing the SaaS application 210. After the gateway service 208 returns the one-time URL and identifies the preferred browser, the client interface service 216 may pass that information along to the resource access application 224. The client 165 may then launch the identified browser and initiate a connection to the gateway service 208. The gateway service 208 may then request an assertion from the single sign-on service 222. Upon receiving the assertion, the gateway service 208 may cause the identified browser on the client 165 to be redirected to the logon page for identified SaaS application 210 and present the assertion. The SaaS may then contact the gateway service 208 to validate the assertion and authenticate the user 226. Once the user has been authenticated, communication may occur directly between the identified browser and the selected SaaS application 210, thus allowing the user 226 to use the client 165 to access the selected SaaS application 210.

In some embodiments, the preferred browser identified by the gateway service 208 may be a specialized browser embedded in the resource access application 224 (when the resource application is installed on the client 165) or provided by one of the resource feeds 206 (when the resource application 224 is located remotely), e.g., via a secure browser service. In such embodiments, the SaaS applications 210 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 165 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 206) for assessment of its security risk by a web filtering service. For approved URLs, the specialized browser may be permitted to access the link. For suspicious links, however, the web filtering service may have the client interface service 216 send the link to a secure browser service, which may start a new virtual browser session with the client 165, and thus allow the user to access the potentially harmful linked content in a safe environment.

In some embodiments, in addition to or in lieu of providing the user 226 with a list of resources that are available to be accessed individually, as described above, the user 226 may instead be permitted to choose to access a streamlined feed of event notifications and/or available actions that may be taken with respect to events that are automatically detected with respect to one or more of the resources. This streamlined resource activity feed, which may be customized for each user 226, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 165 to notify a user 226 of something that requires the user's attention (e.g., approval of an expense report, new course available for registration, etc.).

Figure 2C:
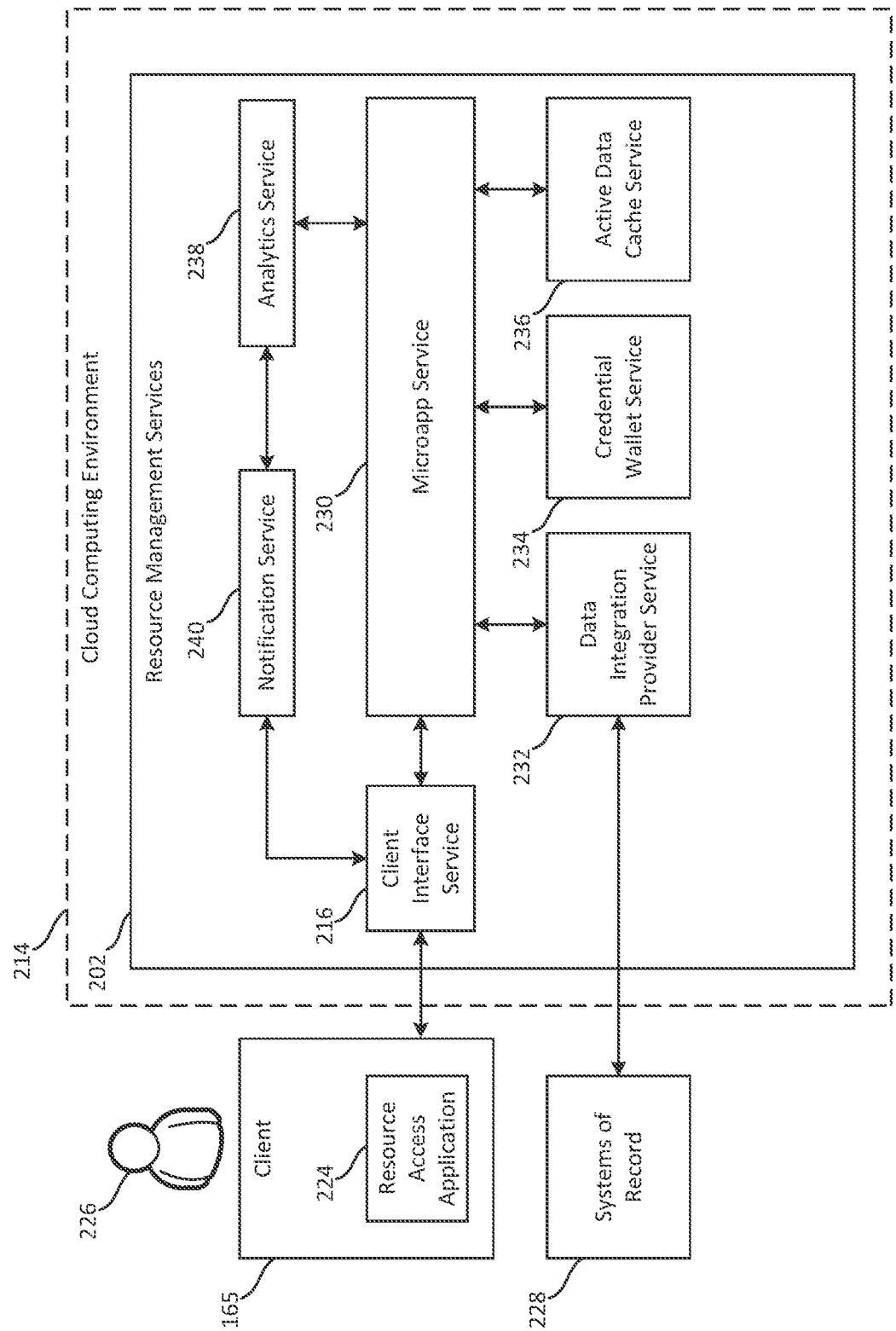
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 228 labeled "systems of record," and further in which several different services are included within the resource management services block 202. As explained below, the services shown in FIG. 2C may enable the provision of a streamlined resource activity feed and/or notification process for a client 165. In the example shown, in addition to the client interface service 216 discussed above, the illustrated services include a microapp service 230, a data integration provider service 232, a credential wallet service 234, an active data cache service 236, an analytics service 238, and a notification service 240. In various embodiments, the services shown in FIG. 2C may be employed either in addition to or instead of the different services shown in FIG. 2B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 224 without having to launch the native application. The system shown in FIG. 2C may, for example, aggregate relevant notifications, tasks, and insights, and thereby give the user 226 a dynamic productivity tool. In some embodiments, the resource activity feed may be intelligently populated by utilizing machine learning and artificial intelligence (AI) algorithms. Further, in some implementations, microapps may be configured within the cloud computing environment 214, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 228 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 232, may, for example, support REST API, JSON, OData-JSON, and 6ML. As explained in more detail below, the data integration provider service 232 may also write back to the systems of record, for example, using OAuth2 or a service account.

In some embodiments, the microapp service 230 may be a single-tenant service responsible for creating the microapps. The microapp service 230 may send raw events, pulled from the systems of record 228, to the analytics service 238 for processing. The microapp service may, for example, periodically pull active data from the systems of record 228.

In some embodiments, the active data cache service 236 may be single-tenant and may store all configuration information and microapp data. It may, for example, utilize a per-tenant database encryption key and per-tenant database credentials.

In some embodiments, the credential wallet service 234 may store encrypted service credentials for the systems of record 228 and user OAuth2 tokens.

In some embodiments, the data integration provider service 232 may interact with the systems of record 228 to decrypt end-user credentials and write back actions to the systems of record 228 under the identity of the end-user. The write-back actions may, for example, utilize a user's actual account to ensure all actions performed are compliant with data policies of the application or other resource being interacted with.

In some embodiments, the analytics service 238 may process the raw events received from the microapps service 230 to create targeted scored notifications and send such notifications to the notification service 240.

Finally, in some embodiments, the notification service 240 may process any notifications it receives from the analytics service 238. In some implementations, the notification service 240 may store the notifications in a database to be later served in a notification feed. In other embodiments, the notification service 240 may additionally or alternatively send the notifications out immediately to the client 165 as a push notification to the user 226.

In some embodiments, a process for synchronizing with the systems of record 228 and generating notifications may operate as follows. The microapp service 230 may retrieve encrypted service account credentials for the systems of record 228 from the credential wallet service 234 and request a sync with the data integration provider service 232. The data integration provider service 232 may then decrypt the service account credentials and use those credentials to retrieve data from the systems of record 228. The data integration provider service 232 may then stream the retrieved data to the microapp service 230. The microapp service 230 may store the received systems of record data in the active data cache service 236 and also send raw events to the analytics service 238. The analytics service 238 may create targeted scored notifications and send such notifications to the notification service 240. The notification service 240 may store the notifications in a database to be later served in a notification feed and/or may send the notifications out immediately to the client 165 as a push notification to the user 226.

In some embodiments, a process for processing a user-initiated action via a microapp may operate as follows. The client 165 may receive data from the microapp service 230 (via the client interface service 216) to render information corresponding to the microapp. The microapp service 230 may receive data from the active data cache service 236 to support that rendering. The user 226 may invoke an action from the microapp, causing the resource access application 224 to send that action to the microapp service 230 (via the client interface service 216). The microapp service 230 may then retrieve from the credential wallet service 234 an encrypted Oauth2 token for the system of record for which the action is to be invoked, and may send the action to the data integration provider service 232 together with the encrypted Oath2 token. The data integration provider service 232 may then decrypt the Oath2 token and write the action to the appropriate system of record under the identity of the user 226. The data integration provider service 232 may then read back changed data from the written-to system of record and send that changed data to the microapp service 230. The microapp service 232 may then update the active data cache service 236 with the updated data and cause a message to be sent to the resource access application 224 (via the client interface service 216) notifying the user 226 that the action was successfully completed.

In some embodiments, in addition to or in lieu of the functionality described above, the resource management services 202 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back-end. In some embodiments, users may be able to interact with the virtual assistance through either the resource access application 224 or directly from another resource, such as Microsoft Teams. This feature may allow employees to work efficiently, stay organized, and deliver only the specific information they are looking for.

C. Systems and Methods for Implementing Microapps within Digital Workspaces

Conventionally, digital workspaces can provide unified access to applications and data, such as pools or aggregations of applications or desktops. However, the conventional digital workspaces alone may not be enough to satisfy the needs and expectations of the users of the digital workspace, as some may be disengaged due to context-switching, searching application details, passwords, among other collective features piled into the digital workspace. Microapps were introduced within digital workspaces to reduce context-switching, eliminate the need to learn how to use various applications, and allow for core functionalities of each application to be brought together in one place. Microapps service can be included in a workspace that gives users a single unified experience with notifications, actions, and workflows to guide and automate work that is, for example, a part of Software as a Service ("SaaS"), legacy, and homegrown applications. However, it is still challenging to motivate users to adopt and use microapps within the workspace, such as to improve user experience and productivity of the task at hand.

The present disclosure is directed towards systems and methods for implementing microapps within digital workspaces. The systems and methods of this technical solution can assign scores to microapps and prioritize microapps based on at least the functionalities of a microapp, the identity of the user, among others, to improve experience and productivity of the user, thereby increasing the adoption rate of microapps. The digital workspace can include at least a point scoring system, competition among users, rewards (e.g., based on points earned by one or more users), difficulty levels, and rule settings to increase motivation and engagement of users when using microapps. Further, users can be acknowledged or recognized for everyday tasks based on their accumulated scores.

Workspace products that integrate or otherwise include microapps can simplify tasks and improve the experience and productivity of users by reducing application launch/access time and enhancing microapps organization/prioritization. To increase the adoption of microapps, the system and methods can prioritize microapps by assigning scores (which can indicate the importance or urgency of the task), predict the likelihood that the user will launch the microapp, and launch (e.g., automatically launch) at least one microapp when the user access the workspace or customize the arrangement of the microapps. With the daily usage of microapps throughout day-to-day work, user experience can be improved. As such, the systems and methods can facilitate a score-oriented experience in workspace microapps by intelligently point-scoring actions and usages of microapps for individual users and rewarding them appropriately based on users' ranking or collected scores. Accordingly, the technical solution described herein can increase the efficiency of launching microapps within a workspace using point-scoring features and mechanics and decrease resource consumption for the workspace via prioritization of a microapp for the user to complete, thereby reducing multiple instantiations of the microapp to complete the task. Further, the technical solution can improve the time for users to access the microapp (e.g. via pre-launching or pre-fetching data to be accessed prior to a request from a user, such that the microapp may be instantly available when the user makes a request to access the microapp) and avoid falsely instantiating other applications the user may not likely to access (e.g. wasting memory, processing power, and bandwidth).

Figure 3:
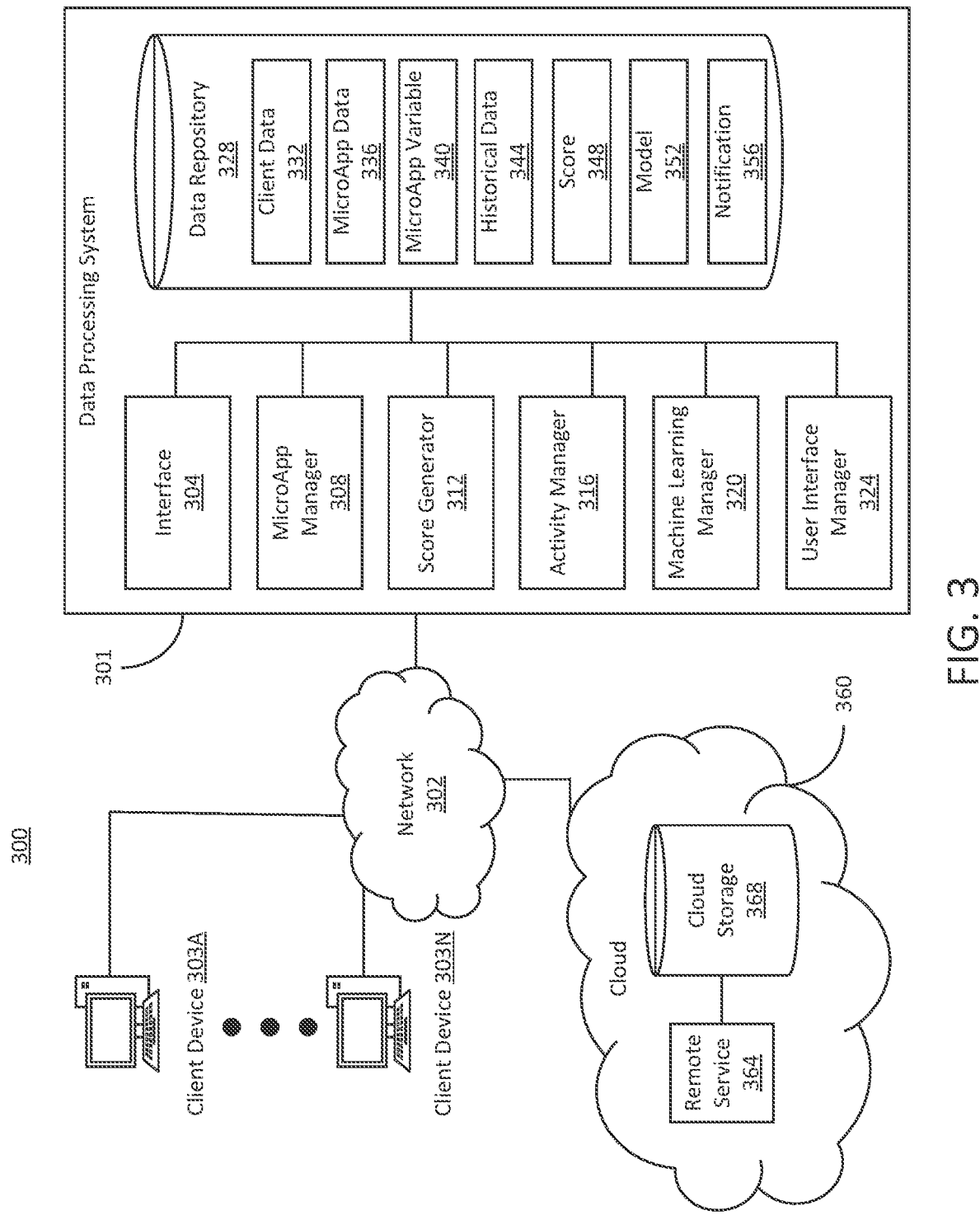
FIG. 3 is a block diagram of an example system to implement micro applications in digital workspaces, in accordance with one or more implementations.

Referring to FIG. 3, depicted is a block diagram of one embodiment of a system 300 for implementing micro applications within a digital workspace. The system 300 can include at least one data processing system 301 ("DPS"), at least one network 302, one or more client devices 303A-N (e.g., generally referred to as client device(s) 303), and at least one cloud 360 (e.g., cloud network, server, or remote computing device). These elements can be referred to generally as one or more components of the system 300. The system 300 can utilize the features and functionalities of one or more components to perform at least one of prioritization of application, prediction of application launch, or launch (e.g., automatically launching) of one or more applications within a digital workspace. Each component can receive or transfer data (or communicate) with other components of the system 300 via the network 302. The DPS 301 can be referred to as a computing device, a digital workspace or microapp managing device/system, workspace microapp builder, intelligent point scoring system, or a server different from the cloud 360 (e.g., a first server and the cloud 360 as the second server).

The digital workspace (or workspace application) can be a client application installed on a device or other endpoints (such as virtual desktops) to provide users with secure, self-service access to documents, applications, and desktops. The workspace application can provide on-demand access to desktop, web and SaaS applications.

Each of the above-mentioned elements or entities can be implemented in hardware, or a combination of hardware and software, in one or more embodiments. Each component of the system 300 may be implemented using hardware or a combination of hardware or software detailed above in connection with at least FIGS. 1A-B and 2A-C. For instance, each of these elements or entities can include any application, program, library, script, task, service, process or any type and form of executable instructions executing on hardware of a client device 303 (e.g., the client applications 404). The hardware includes circuitry such as one or more processors in one or more embodiments.

The network 302 can include computer networks such as the Internet, local, wide, metro or other area networks, intranets, satellite networks, other computer networks such as voice or data mobile phone communication networks, and combinations thereof. The components of the system 300 can communicate with each other via the network 302, for example, the DPS 301 can communicate with one or more client devices 303 or the cloud 360. The network 302 may be any form of computer network that can relay information between the DPS 301, the one or more client devices 303, and one or more information sources, such as web servers or external databases, amongst others. The network 302 can link digital workspace applications to the source applications, such as syncing data between microapps (e.g., having core functionalities of an application) to their source applications. In some implementations, the network 302 may include the Internet and/or other types of data networks, such as a local area network (LAN), a wide area network (WAN), a cellular network, a satellite network, or other types of data networks. The network 302 may also include any number of computing devices (e.g., computers, servers, routers, network switches, etc.) that are configured to receive and/or transmit data within the network 302. The network 302 may further include any number of hardwired and/or wireless connections. Any or all of the computing devices described herein (e.g., the DPS 301, the client devices 303, the cloud 360, the computer 101, etc.) may communicate wirelessly (e.g., via WiFi, cellular, radio, etc.) with a transceiver that is hardwired (e.g., via a fiber optic cable, a CAT5 cable, etc.) to other computing devices in the network 302. Any or all of the computing devices described herein (e.g., the DPS 301, the client devices 303, the cloud 360, the computer 101, etc.) may also communicate wirelessly with the computing devices of the network 302 via a proxy device (e.g., a router, network switch, or gateway). In some implementations, the network 302 can be similar to or can include the network 170 or a computer network accessible to the computer 101 described herein above in conjunction with FIG. 1A or 1B.

Each of the client devices 303 can include at least one processor and a memory, e.g., a processing circuit. The memory can store processor-executable instructions that, when executed by processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The client devices 303 can include one or more computing devices or servers that can perform various functions as described herein. The one or more client devices 303 can include any or all of the components and perform any or all of the functions of the computer 101 or the client or client devices 165 described herein in conjunction with FIGS. 1A-2C. The client devices 303 can be, or can be similar to, the client devices 165 described herein above in conjunction with FIGS. 1A-2C.

Each client device 303 can include, but is not limited to, a television device, a mobile device, smart phone, personal computer, a laptop, a gaming device, a kiosk, or any other type of computing device. Each client device 303 can be implemented using hardware or a combination of software and hardware. Each client device 303 can include a display device that can provide visual information, such as information presented as a result of executing instructions stored in the memory of the client device 303. The display device can include an liquid-crystal display (LCD) device, an organic light-emitting diode (OLED) display, a light-emitting diode (LED) display, a bi-stable display (e.g., e-ink, etc.), amongst others. The display device can present one or more user interfaces to on various regions of the display in accordance with the implementations described herein. In some implementations, the display device can include interactive elements, such as a capacitive or resistive touch sensors. Thus, the display device can be an interactive display (e.g., a touchscreen, a display, etc.), and can include one or more input/output (I/O) devices or interfaces. Each client device 303 can further include or be in communication with (e.g., via a communications bus coupled to the processors of the client devices 303, etc.) one or more input devices, such as a mouse, a keyboard, or digital key pad, among others. The display can be used to present one or more applications as described herein, such as web browsers or native applications. The display can include a border region (e.g., side border, top border, bottom border). The inputs received via the input/output devices (e.g., touchscreen, mouse, keyboard, etc.) can be detected by one or more event listeners, and indicate interactions with one or more user interface elements presented on the display device of the client devices 303. The interactions can result in interaction data, which can be stored and transmitted by the processing circuitry of the client device 303 to other computing devices, such as those in communication with the client devices 303. The interaction data can include, for example, interaction coordinates, an interaction type (e.g., click, swipe, scroll, tap, etc.), and an indication of an actionable object with which the interaction occurred. Thus, each client device 303 can enable a user to interact with and/or select one or more actionable objects presented as part of graphical user interfaces to carry out various functionalities as described herein.

The client devices 303 can each execute one or more client applications, such as a web browser, native application, or microapps within a digital workspace that is provided or managed by the DPS 301. The one or more client applications can cause the display device of one or more client devices 303 to present a user interface that includes the digital workspace with one or more microapps. The digital workspace can be accessed by an administrator or developer (e.g., using one of the client devices 303). The administrator can configure microapps within the digital workspace, such as assign at least one microapp for different types of accounts accessing the workspace. For example, the administrator can assign administrative or managerial-related microapps for employees within the human resources ("HR") department, assign software-related microapps for a software developer or engineer, or assign ticket management, common Q&A, or feedback manager microapps for all users that access the workspace. In some implementations, the client application can include a local application (e.g., local to a client device 303), hosted application, Software as a Service (SaaS) application, virtual application, mobile application, and other forms of content. In some implementations, the application can include or correspond to applications provided by remote servers or third-party servers.

The one or more applications, such as discussed above, can be microapps presented to the client device 303 in a workspace. The workspace can be managed by the DPS 301. The workspace can be a software platform that can be remotely accessed by the client devices 303. The workspace can present a virtual desktop or remote desktop running on the DPS 301 or the cloud 360. The client device 303 can include an operating system capable of executing the digital workspace software platform and launching microapps installed in the workspace. The client device 303 can launch the workspace platform via a browser application, a remote desktop, or a locally stored application. The client device 303 can receive inputs from a user to interact with at least one interactive element within the workspace (e.g., icons associated with a microapp, developer settings configurable by administrators, among others). In some cases, upon opening the workspace software, the client device 303 can receive an interface of a microapp (e.g., automatically launched responsive to a request to open the digital workspace). Subsequently, the client device 303 can receive other inputs from the user to perform tasks within a microapp. In some cases, a client device 303 can launch multiple microapps simultaneously. For example, the client device 303 can transmit a request for a first microapp and a second microapp to the DPS 301. The client device 303 can receive both the first microapp and second microapp in different tabs or windows within the workspace. The microapps can remain open until a timeout period (e.g., no user interaction for an extended period, such as 30 minutes or 1 hour) or an indication to terminate the session/microapp (e.g., a user manually exiting the microapp).

Each of the client devices 303 can perform daily tasks using one or more microapps in the workspace. Each microapp can include a part of or one or more features and functionalities of a source application (e.g. the application from which the microapp was generated or extracted). A source application can be included in a system of record ("SoR") storage data source for the one or more microapps, and may be an original application or data source of at least one microapp in the workspace. For example, a source application such as an email application may be used to generate a microapp for reading and replying to messages of a single conversation thread, from a particular user or group of users, or similar functions. The microapp may thus provide a portion of the functionality of the source application, at a reduced memory, processing, and bandwidth footprint (and potentially with a more intuitive and easy to use interface for users, uncluttered by unrelated functionality of the source application, such as a pared down word processing microapp that does not include advanced page layout features of the source application). The DPS 301 can retrieve data of the source application (e.g., from the SoR) to update or install one or more microapps associated with various core features of the source application. For example, an administrator can incorporate an HR application, a productivity application, and a broadcast application in the workspace. The administrator can integrate at least one application (e.g., source application, such as a video streaming service) from a list of available source applications into the workspace to be accessible for the users. By integrating the application, the workspace can divide core features of the application into multiple microapps (e.g., microapp for uploading, downloading, viewing, or editing the video streams). For example, for an HR application, the workspace can include microapps for ticket management, feedback, reimbursement submission, expense summary, or income summary. For a productivity application, the workspace can include microapps for document management, document template generation, conference call, or password management. For a broadcast application, the workspace can include microapps for announcements management, message creation, or broadcast history. Other applications supported by the workspace can include other microapps, for example. In some cases, the administrator can select one or more microapps from each application to be accessible in the workspace.

The cloud 360 can include at least one processor and a memory, e.g., a processing circuit. The memory can store processor-executable instructions that, when executed by processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The cloud 360 can include any or all of the components and perform any or all of the functions of computer 101 described herein in conjunction with at least FIG. 1A. The cloud 360 can be, or can be similar to, the cloud 175 described herein above in conjunction with FIG. 1B.

The cloud 360 can be referred to as a cloud service, a cloud storage service, third party resource provider, or a remote computing environment. The remote computing environment can include at least one remote service 364 and storage 368. In some cases, the remote computing environment can be referred to as a remote service 364. The remote service 364 can be referred to as a cloud service. The remote service 364 can include remote desktop, Infrastructure as a Service ("IaaS"), Platform as a Service ("PaaS"), Desktop as a Service ("DaaS"), Software as a Service ("SaaS"), among other services. The remote service 364 can include application management. The remote service 364 can perform the features described to interact with the DPS 301 and the client device 303. The remote service 364 can include one or more features and functionalities of the DPS 301 or at least one component of the DPS 301. The storage 368 can be referred to as or used interchangeably with other descriptive terms, such as remote data repository, remote memory, or global server storage. The storage 368 can be physical storage volumes and virtual storage volumes or arrays thereof. The storage 368 can store information received from the client device 303. The remote computing environment can receive an indication from the client device 303 not to store one or more information received from the client device 303, such as for privacy purposes. The storage 368 can store one or more data similar to the data repository 328, for example.

The storage 368 can store credentials, identification, or authorization information of one or more users (e.g., users of the client devices 303). The credentials can be associated with one or more applications or microapps managed by either the remote computing environment or the DPS 301. For example, the remote computing environment can receive credentials from the client device 303. The remote computing environment can compare the credentials to a list of existing account logins (e.g., accounts authorized to access a session of an application or a microapp). If the credential matches with the existing account login, the remote computing environment can create a session and transmit the session identifier to the client device 303 for access. Otherwise, the remote computing environment can either request additional authentication (proof of identity) from the client device 303, lock the account that the client device 303 attempted to sign-in, provide notification of the unsuccessful login attempt, search for a listing of account credential on a different server (e.g., a second cloud managing the application or microapp), among other actions to provide the application to authorized users and prevent access from the attempted break-in.

The remote computing environment can connect to other components (e.g., DPS 301 or client devices 303) of the system 300 via the network 302. The remote computing environment can assist the DPS 301 or other components of the system 300 to perform prioritization of microapps, storage of microapps data, predictive launching of a microapp, or pre-launching microapps, for example. In some cases, the remote computing environment can include hardware, software, or a combination of hardware and software components of the DPS 301. As such, the remote computing environment can perform one or more features and functionalities of the DPS 301. For example, the remote computing environment can manage one or more applications, such as at least one source application of various microapps. A source application can refer to an application that the core functionalities of the microapps are derived from. The remote computing environment can update individual applications responsive to any configuration changes or updates introduce or received from the developers of the application. The remote computing environment can update one or more microapps within a workspace, such as by transmitting data packages to the DPS 301 managing the workspace. The data packages can include updated data of one or more respective microapps.

In some cases, the remote computing environment can perform features and functionalities of one or more components of the DPS 301. In some cases, the remote computing environment can include the one or more components of the DPS 301. For example, the remote computing environment can receive at least a delegated task from the DPS 301, such as activity monitoring, data processing, machine learning training, behavioral analysis, launch prediction, among others. The remote computing environment can process information received from the DPS 301 and output results for the DPS 301. The remote computing environment can transmit the output to the DPS 301. The remote computing environment can pre-process information received by the DPS 301, such as clean, apply filters, normalize, transform, select, remove, or edit data transmitted to the DPS 301. In this case, the remote computing environment can either retrieve or receive data from the DPS 301 or directly from the source to be pre-processed.

In some cases, the remote computing environment can be a server, a remote application, or a part of the application server, where the DPS 301 can be an intermediary device between the remote computing environment and the client device 303. For example, the remote computing environment can manage microapps that are presented to client devices 303 within a workspace managed by the DPS 301. The DPS 301 can receive a request from the client device 303 to access at least one microapp on the remote computing environment. The remote computing environment can generate a session with a session ID and transmit the session ID to the client device 303 to provide access to the client device 303. In some cases, the remote computing environment (or the DPS 301) can identify the identity and confirm that the user of the client device 303 have permission to access one or more applications or microapps. The DPS 301 can monitor the activities of the user in the session of a microapp. For example, the DPS 301 can receive one or more inputs (or other data) from the client device 303 in the microapp. The DPS 301 can forward the inputs to the remote computing environment to update contents or perform actions within the microapp.

The system 300 can include at least one DPS 301 for managing, prioritizing, or configuring microapps within a workspace. The DPS 301 can include at least one processor and a memory, e.g., a processing circuit. The memory can store processor-executable instructions that, when executed by the processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The DPS 301 can include one or more computing devices or servers that can perform various functions as described herein. The DPS 301 can include any or all of the components and perform any or all of the functions of the computer 101 described herein in conjunction with FIG. 1A. The DPS 301 can include components and perform any or all of the features and functionalities of at least one cloud 175, such as in conjunction with FIG. 1B. The DPS 301 can include components and perform any or all of the features and functionalities of the resource management service(s) 202 or the cloud computing environment 214 in conjunction with FIGS. 2A-C.

The DPS 301 can connect to other devices and components of the system 300, such as client devices 303 or the remote computing environment via the network 302. The DPS 301 can transmit or receive data to or from the client device 303 or the remote computing environment. The DPS 301 can process and output data from one or more components in the system 300. The DPS 301 can perform features of an intelligent point scoring system to assign scores to microapps based on values of adjustable variables configured by an administrator or developer of the workspace platform. The DPS 301 can manage the workspace platform to provide microapps to client devices 303. The adjustable variables can refer to options or criteria within the settings of the microapp. The DPS 301 can provide a user interface ("UI") to one or more client devices 303 or end-users. The UI associated with individual users can include scores obtained by the account owner. The DPS 301 can provide score analytics (e.g., using the score as input to determine nature of work, demand for microapp, characteristics of the user, etc.) and ranking of users (e.g., used to determine rewards or highest performer). In some cases, the DPS 301 can be a part of an analytic service system or an application programming interface ("API"). The DPS 301 can prioritize or pre-launch microapps, or predict at least one microapp a respective user is likely to launch based on the score dynamically determined or assigned by the developer.

The DPS 301 can include one or more components to perform features and functionalities described herein, including at least an interface 304, a microapp manager 308, a score generator 312, an activity manager 316, a machine learning manager 320, a user interface ("UI") manager 324, and a data repository 328. The data repository 328 can include at least a client data storage 332, a microapp data storage 336, a microapp variable storage 340, a historical data storage 344, a score storage 348, a model storage 352, and a notification storage 356. The data repository 328 can include data stored in the storage 368. In some cases, the DPS 301 can relocate or transfer data between the data repository 328 and the storage 368. For example, the DPS 301 can store data on the storage 368 or retrieve data from the storage 368 and store the retrieved data in the data repository 328. The data repository 328 can be referred to as the memory of the DPS 301, for example. The data repository 328 can be accessed by one or more components within the DPS 301 (e.g., interface 304, microapp manager 308, score generator 312, activity manager 316, machine learning manager 320, or user interface manager 324). The data repository 328 can be accessed by authorized client devices 303. For example, the DPS 301 can receive a credential from the client device 303 associated with an account and perform a look-up to determine the information that the account owner is eligible to access in the data repository 328.

The client data storage 332 (e.g., generally referred to as client data 332) can include, store, or maintain data received from one or more client devices 303. For example, the client data 332 can include credentials (e.g., username, password, email, etc.) provided by the user, cache from the client device 303, location of the client device 303 (e.g., given the permission), or account information of the user. The credentials can be used to access an account of the workspace or at least one microapp within the workspace. Based on the type of account different microapps can be available to the client device 303 (e.g., administrator, employee, or guest account). For example, an administrator account can have access to all microapps accessible on the workspace and the ability to configure microapps that can be accessed by the workspace. The employee account can access the workspace and at least a portion of the microapps enabled for the user by the administrator. The guest account can have access to at least one microapp that the guest requested (e.g., at least one direct link to the microapp). The guest account may not have access to other features or functionalities within the workspace, for example. The account information can include the type of account, identity of the account owner, contact information, restrictions (e.g., microapps or features accessible to the account), among others. The client data 332 can store search history in the workspace or web-browser search history of the client devices 303.

The client data 332 can be retrieved by one or more components within the DPS 301. For example, the retrieved data from the client data 332 can be used to calculate a score for at least one microapp (e.g., the at least one microapp accessible to the account associated with the data). The client data 332 can store activities of the user accessing the workspace or at least one microapp in the workspace, such as length of time the microapp is opened, activities within the microapp (e.g., keypresses, mouse clicks, scrolls, etc.), completed tasks, among others. The client data 332 can be used to determine the productivity and engagement of the user. Further, the client data 332 can include activities from any or all client devices 303 accessing the workspace. The client data 332 can be retrieved and used to determine, for example, the difficulty of the task (e.g., based on at least the length of time, interactions with elements in a microapp, or how many times the microapp is launched to complete a task), the engagement level of the microapp, or participation level (e.g., the total number of users/accounts utilizing the microapp). Based on at least the above-indicated data, the client data 332 can be used to adjust the score of one or more microapps to prioritize or automatically launch the microapps.

The microapp data storage 336 (e.g., generally referred to as microapp data 336) can include, store, or maintain microapp data. The microapp data can include a user interface, one or more features/functionalities, executable script (e.g., executed responsive to an interaction with an element in the microapp), links, among other data from at least a part of the source application. The microapp data 336 can store data retrieved (e.g., by the DPS 301) from the remote computing environment, such as an update to at least one microapp. In some cases, the microapp data 336 can be synced or linked to a part of the storage 368 to maintain up-to-date information related to the microapp. For example, the storage 368 can store data of a source application. By syncing the microapp data 336 to the storage 368, updates to the source application can be reflected in the data of one or more microapps having one or more core functionalities of the source application. The microapp data 336 can be used by one or more components of the DPS 301 to execute the microapps (e.g., deliver/provide features and functionalities of the microapps to users, which can be directly accessible from the workspace).

The microapp variable storage 340 (e.g., generally referred to as microapp variable 340) can include, store, or maintain attributes, details, or descriptions of each microapp. The details can be entered or provided by a developer or administrator using a microapp manager 308 (e.g., a part of the developer console). Other attributes (e.g., adjustable variables) can be configured by the administrator or dynamically determined by a machine learning model, for example. The microapp variable 340 can be retrieved by one or more components of the DPS 301 to compute or determine a score for a microapp or individual users independent of others utilizing the microapp. Examples of the attributes stored in the microapp variable 340 can include at least the inherent microapp components (e.g., microapp design components) or microapp use case inputs from administrators (e.g., stored at the time of deployment of a microapp as a part of the process for delivering the microapp).

The design components can include, but not limited to, Integration System of Record ("SoR") (e.g., software as a service ("SaaS"), custom, legacy, or on-premise application that the microapp is part of), title/name, short description, microapp type, number of action buttons, number of notifications set up, number of expected user inputs, and user effort of a microapp. The microapp type can include an action type (e.g., allows users to take action or write back into the SoR), a notification type (e.g., allows users to view information alerts on specific details in the SoR), or both (e.g., includes features and functionalities of both action type or notification type). The number of action buttons can indicate the total number of action buttons within the application. The number of notifications set up can indicate the total number of notifications designed by the application to alert, ping, or update the client devices 303 on the status of the microapp or events within the microapp. The number of expected user inputs can include the total number of user input components in the microapp design, such as how many clicks, keypresses, or interactions the user is expected to perform during a session when launching a microapp. The user effort can refer to the amount of time to enter necessary inputs for the microapp, such as deriving from the above-mentioned inputs. For example, a higher time gap between user inputs can indicate a lower amount of effort exerted by the user to complete a task (e.g., low level of engagement/interaction/usage), while a lower time gap for inputs can indicate that the user is highly engaged with the microapp features or that the user is constantly performing actions/tasks within the application. Information from the microapp variable 340 can be retrieved by the microapp manager 308 or microapp builder, such as after the application is deployed on a client device 303.

The microapp use case inputs received from administrator can include, but not limited to, a target user persona (e.g., fields, industry, experience level, or job title of user) for the microapp, a number of known open issues at release, a number of dependencies for a user to use the microapp, end-user relevance, end-user training requirement, business impact, total persona members, expected transactions in a timeframe, time per transaction, and workflow details. The target user persona for the microapp can include one or more groups of users (e.g., type of accounts) the microapp is targeting, such as a general group of users, users from different departments, users from different fields or professions (e.g., healthcare, education, engineering, etc.) users at different hierarchies of a respective profession (e.g., manager, employees, instructor, students, etc.), among others. The number of known open issues at release can include any open issues that can impact the user experience or complexity of application use. The number of dependencies can refer to any systems or processes that one or more users interact with to use the microapp, such as an external device coupled to the client device 303 to initiate the microapp (e.g., launching the software for the device), software installation, file downloads, or any system updates to use all features of the microapp.

Further from the above, the end-user relevance can include a scale (e.g., 1 to 5 with 5 being the highest relevance, among other scales) indicating how relevant the microapp is to the users (e.g., target users). For example, if targeting financial advisors, microapp for submitting tickets can have a 2 for relevance, while microapps for financial analytics can have a 5 for relevance. The end-user training requirement can indicate whether users should be trained prior to using the microapp. The business impact can indicate the impact (e.g., business development, user development, or learning progress) the microapp can have on the user or the enterprise managing the workspace. The business impact can be ranked on a scale of, for example, 1 to 5, with 5 being the highest. Other scales can include 1 to 10, with 10 being the highest, for example. The personal members total can indicate the number of individuals in the persona group that the microapp is targeting. The expected transactions in a day can indicate an expected number of times the microapp will be launched by users given a timeframe (e.g., a day, a week, or a month), such as based on historical data of the SoR or the source application (e.g., from the historical data storage 344).

Further, the time per transaction can indicate an average time to complete the same tasks or operations using the microapp compared to in the source system or source application. For example, less time per transaction (e.g., takes less time to complete a task using the microapp) can induce a higher score to enhance engagement or encourage users to use the microapp, and more time per transaction can induce a lower score for the microapp. The time per transaction can be based on the historical data of the SoR or the source application. The workflow details can indicate whether or not the microapp includes a review workflow (e.g., operations performed in the microapp can be reviewed or edited by at least one other user) and how many reviews are present in the workflow. The number of reviews presented can incrementally increase the score for the microapp (e.g., presented for the user to incentivize completing the task within the microapp). In some cases, the microapp data 336 can include a countdown or timer for when at least one task of a microapp should be completed. The microapp data 336 can include other values of adjustable variables or attributes of microapps, such as in conjunction with FIG. 6.

The historical data storage 344 (e.g., generally referred to as historical data 344) can include, store, or maintain a log of the historical use of the microapp by one or more client devices 303. The log can include lists of device identifiers associated with the client devices 303. The log can include timestamps of when an application was launched (e.g., session start time) and when the application was terminated (e.g., session end time). The log can include the length of time each user uses the microapp. The log can include one or more historical activities performed by the user. The log can include the total number of client devices 303 that launch a respective microapp in an hour, a day, a week, etc. The log can include an average, a mean, a median, a mode, or other statistics indicating the number of client devices 303 that launched or used the microapp during a time frame. The log can include a frequency metric, such as the frequency of individual microapps being used by client devices 303. The log can sort the data in any format, such as highest value to lowest value, lowest to highest, grouping the types of accounts frequently using a respective type of microapp, etc. The log can be downloaded and presented to the administrator or developer device, such as to determine which applications are highly used or not often used by the users. The historical data 344 can include, store, or maintain other indications use by the client devices 303.

The historical data 344 can be retrieved or accessed by one or more components of the DPS 301. For example, the log can be retrieved by the DPS 301 to calculate the score of individual microapps. Based on the historical usage of microapps, the DPS 301 can determine to increase or decrease the score based on the usage frequency. For example, the DPS 301 can increase a score associated with a microapp with low usage. On the other hand, the DPS 301 can decrease a score associated with a microapp with high usage, for example, since one or more users have adopted the microapp into their daily routine. In another example, the DPS 301 can increase the score based on the number of client devices 303 using a microapp (e.g., increase the score associated with a microapp with a low quantity of devices, or decrease the score if a high quantity of devices is using the microapp).

The score storage 348 (e.g., generally referred to as score 348) can include, store, or maintain scores associated with individual microapps and scores collected by the users. The score storage 348 can store scores generated by the score generator 312. The score storage 348 can include a hash table with associations between one or more scores and individual microapps. For example, the score storage 348 can include a first score of a microapp generated for a first user and a second score for the same microapp generated for a second user. The score between users can differ based on the type of account accessing the workspace, business impact, time left for completion (e.g., urgent applications can include a higher score), relevancy to the user (e.g., the microapp can be more relevant to the first user than the second user, thereby having a higher score for the first user), among other factors.

The score storage 348 can include, store, or maintain accumulated scores of users (e.g., user score). The scores can be referred to as a counter, such that a user gaining a score for a microapp can increase the counter. A decrease in the score can refer to a decrease in the counter. The score storage 348 can link a score to a user identifier (e.g., account identifier or client identifier of a client device 303). The one or more components of the DPS 301 can access the score storage 348 to adjust or update the score of the user, such as increasing the score subsequent to completing a task (e.g., satisfying a threshold within a microapp). In some cases, the DPS 301 can access and decrease the score of the user in the score storage 348 after the user missed an objective or task. The decrease can be equal to, less than, or greater than an assigned score for the microapp. For example, not using the microapp can reduce the user score by twice the amount of score assigned to the microapp, thereby encouraging users to complete the task. The score storage 348 can include a ranking of users based on the accumulated scores of individual users.

The score storage 348 can include, store, or maintain indications of rewards associated with one or more thresholds (e.g., reward thresholds). The threshold can indicate the total accumulated score needed to obtain at least one reward. The reward can include any prize that can be provided to the user, such as gift cards, rank increase (e.g., the rank of the user account), an upgrade to the user interface of the workspace for the user, increase of privilege for accessing other microapps within the workspace, among other rewards. For example, the DPS 301 can access the score storage 348 to determine whether at least one user reaches a reward threshold. Subsequent to identifying a user account satisfying the reward threshold, the DPS 301 can transmit a notification to the user device notifying the user of the redeemable reward, for example. In some cases, the score storage 348 can include, store, or maintain a launch threshold, where the DPS 301 can launch at least one microapp based on the score assigned to the microapp.

The model storage 352 (e.g., generally referred to as model 352) can include, store, or maintain one or more machine learning models. The machine learning model can be used by at least one component of the DPS 301, such as the machine learning manager 320. The machine learning model can be used to predict a microapp a user is likely to launch upon accessing the workspace, compute a score for microapps based on at least the attributes of the microapp (e.g., adjustable variables or components of the microapp) or the account information (e.g., type of user account), or pre-store microapp launch data, for example. The machine learning model can execute on the server, in-browser, within the workspace platform, or by the DPS 301. The machine learning model can be trained or updated by using data collected or retrieved from client devices and the workspace platform, such as data from the client data 332, the microapp data 336, the microapp variable 340, the historical data 344, or the score storage 348. In some cases, the machine learning model can be discarded or replaced with an updated model trained using updated data. The machine learning model can be trained using different types of machine learning algorithms/techniques, such as supervised learning, unsupervised learning, semi-supervised learning, or reinforcement learning. The machine learning model can be referred to as a Neural Network.

The machine learning model can be used to apply natural language processing ("NLP"). For example, the DPS 301 can retrieve the machine learning model for calculating a score for a microapp. The DPS 301 can apply NLP and machine learning to the description section of the microapp (e.g., one of the various attributes or texts within the microapp). The machine learning model can use the description as input to output a score based on at least the user relevance, business impact or value, or time per transaction. Prior to computing the score, the machine learning model can be trained with a historical description of the microapp and the associated score assigned to the microapp having the description. Thus, the machine learning model can calculate the score for microapps based on the description (e.g., a short summary of the core application functions or the title).

The machine learning model can be trained for each user to pre-launch applications or pre-store data of microapps the user is likely to launch within the workspace session. For example, the machine learning model can be trained using historical behavior or information of the user. The DPS 301 can use the machine learning model to determine that the user often sorts the list of microapp in the workspace based on the highest score and access the microapp having the highest score. Therefore, after the user access the workspace, the DPS 301 using the machine learning model can preemptively launch a microapp with the highest associated score. In another example, the DPS 301 using the machine learning model can determine that a user frequently launches the top three microapps with the highest score. Based on the determination, the DPS 301 can store the top tree microapps with the highest score, responsive to the user accessing the workspace.

The notification storage 356 (e.g., generally referred to as notification 356) can include, store, or maintain notification for presentation to the display of the client devices 303. For example, notification can include an indication of successful sign-up, login, or completion of at least a portion of a task in a microapp. In further examples, the notification can include an indication of an unsuccessful login attempt, sign-up attempt, or incomplete task (e.g., no point earned by the user). The notification can be presented as part of the workspace user interface. The notification can be pushed to the client device 303. The notification can present a score earned by the user after completing at least one task in the microapp or satisfying at least one activity threshold (e.g., a threshold of user activity to earn at least a portion of the score assigned to the microapp). In some cases, the notification storage 356 can include, store, or maintain at least one user interface for the workspace or other user interfaces for microapps. The notification storage 356 can include other visual display or graphical interface for presentation on client devices 303, such as within the workspace, remote desktop, or virtual desktop managed by the DPS 301.

The DPS 301 can include an interface 304. The interface 304 can transfer data between one or more components of the DPS 301, such as microapp manager 308, score generator 312, activity manager 316, machine learning manager 320, user interface manager 324, and data repository 328. The interface 304 can include hardware, software, or a combination of hardware and software components to interface with the network 302, devices within the system 300 (e.g., network 302, client devices 303, remote computing environment), or components of the DPS 301. The interface 304 can include features and functionalities similar to the communication interface 118 to interface with the aforementioned components, such as in conjunction with FIG. 1A. For example, the interface 304 can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface 304 can include at least a built-in network adapter, network interface card, PCMCIA network card, EXPRESSCARD network card, card bus network adapter, wireless network adapter, USB network adapter, modem, or any other device suitable for interfacing one or more devices within the system 300 to any type of network capable of communication. The interface 304 can communicate with one or more aforementioned components to at least prioritize at least one microapp within a workspace managed by the DPS 301 (or the remote computing environment), automatically launch a microapp, or predict and pre-store data of microapp that the user is likely to launch responsive to accessing the workspace.

The DPS 301 can include a microapp manager 308 to manage digital workspaces or microapps within each workspace. The microapp manager 308 can be implemented in hardware, software, or a combination thereof. The microapp manager 308 can include or be a part of a microapp builder platform for integrating the SoR application as a microapp into the workspace (e.g., the digital workspace microapps platform). In some cases, the microapp manager 308 can be a part of the workspace platform. The microapp manager 308 can manage the workspace, such as configuring the settings of the workspace based on the microapp administrator or developer. The microapp manager 308 can retrieve, install, or update microapps based on the data of the SoR application or source application. The microapp manager 308 can enable users to access different microapps based on the account type. For example, the microapp administrator or developer can access all available microapps in the workspace platform. For an employee account, the user can access a subset of the microapps, such as microapps assigned to the accounts, requested by the independent users, or approved by the administrator for accessing. The microapp manager 308 can retrieve microapp data or SoR application data stored in the microapp data 336. The microapp manager 308 can launch microapps using the data stored in the microapp data 336.

The microapp manager 308 can deploy the workspace platform subsequent to receiving a request from at least one client device 303 to access the workspace. The microapp manager 308 can verify the identity of the user based on comparing client credentials to a list of user accounts approved for accessing the workspace (e.g., the list stored in the data repository 328). The microapp manager 308 can determine the account type of the user, such as administrator, employees (e.g., business department, HR department, engineering department, managerial position, etc.), or guest. Based on the account type, the microapp manager 308 can provide or restrict access to one or more microapp when launching the workspace. The microapp manager 308 can request additional authentication from the user to access at least one microapp listed in the user interface. In some cases, based on the user data, the microapp manager 308 can transmit a signal to the user interface manager 324 to display different user interfaces for different account types. The user interface can display applications available to the user account.

The microapp manager 308 can launch one or more microapp responsive to receiving a request from the client device 303. The microapp manager 308 can launch the microapp in an existing (e.g., the workspace window), in a new window, or a new tab. The microapp manager 308 can launch the microapp in a background window, such as a window not visible to the user. For example, the microapp manager 308 can instantiate a window in minimized mode or without presentation on the display of the client device 303. Responsive to receiving an indication of interaction from the client device 303, such as on an icon of the microapp, the microapp manager 308 can present the microapp for display on the client device 303. In another example, the microapp manager 308 can launch at least one microapp upon a user accessing the workspace. In this case, the microapp manager 308 can receive an indication, for example, from the machine learning manager 320 that a user is likely to launch the microapp when accessing the workspace, hence, the launch of the microapp prior to receiving a launch request. In further example, the microapp manager 308 can receive a prediction of at least one microapp the user is likely to launch. Based on the prediction, the microapp manager 308 can pre-store data of the microapp in preparation for launch.

The microapp manager 308 can receive or retrieve information on design components, use case inputs, or other values of the attributes of a microapp (e.g., stored in the microapp variable 340). Further, the information can include various application activities, the complexity of the microapp, user effort-related information, among others. The microapp manager 308 can retrieve the attributes prior to the launch of the microapp. The microapp manager 308 can receive inputs from the administrator or developer to configure the values of the attributes. These attributes can be presented in the score calculation input section of the workspace, for example. The microapp manager 308 can forward the values to the score generator 312, for example, to determine which algorithm or calculation technique to use for calculating the score, how much score to assign to individual microapps, or how much score to assign to one or more activities performed by the user in the microapp.

The microapp manager 308 can manage the termination (e.g., timeout or exit) of the microapp or sessions of the microapp. For example, the microapp manager 308 can receive an input from a client device 303 requesting to terminate the session, such as an interaction with a button to end the microapp. Responsive to the request, the microapp manager 308 can close the window, tab, or session presenting the microapp. In some cases, the microapp manager 308 can disable the visibility of the microapp without terminating the session. In this case, the session can terminate after a timeout period. The microapp manager 308 can terminate a session to update the microapps. The microapp manager 308 can terminate a microapp due to inactivity of the client device 303 (e.g., no signals from the device) for a predetermined period, such as 1 hour, 2 hours, etc.

The microapp manager 308 can manage one or more scores assigned to microapps. The microapp manager 308 can manage scores assigned to individual microapps for different accounts. For example, the microapp manager 308 can receive a first score assigned to a microapp for a first user and a second score assigned to the same microapp for a second user. The difference in score for each microapp can be based on different fields the users are in, different time the user accesses the microapp, how active is the user on the workspace, among other information based on the client data (e.g., from client data 332), data from historical data 344, etc. The microapp manager 308 can provide microapps to be evaluated on similar scales for users of the workspace platform.

In some cases, the microapp manager 308 can launch (e.g., automatically launch) a second application. For example, after terminating a first microapp (e.g., after completing the tasks or if the user terminates the session), the microapp manager 308 can launch (or the user interface manager 324 can notify the user to confirm the launch of) a second microapp. The microapp manager 308 can determine the second microapp to be launched based on at least one of the scores assigned to the application, characteristics of the user (e.g., the user is likely to high-scoring application), the type of application, predicted user effort, inputs expected from the user, among others. In some other cases, the microapp manager 308 may not launch a second microapp without a request sent from the client device 303. In some cases, the microapp manager 308 can receive a signal from the client device 303 to change the configuration for pre-launching (e.g., enable/disable predictive launch), prioritization of applications (e.g., auto or manual application arrangement), or other settings available to the user.

The DPS 301 can include a score generator 312 to calculate, generate, or output a score for the microapp. The score generator 312 can be implemented in hardware, software, or a combination thereof. The score generator 312 can be a software engine or a module to calculate the microapp score. The score generator 312 can receive input data (e.g., data samples, input matrix, etc.) from the microapp manager 308. For example, the input data can include values for one or more attributes of the microapp. The attributes can be adjustable variables for the administrator to configure, such as in conjunction with FIG. 6. In some cases, the machine learning manager 320 can use a machine learning model to determine (e.g., dynamically determine) the value for the adjustable variables. In some cases, the score generator 312 can include or be a part of a point scoring system which can be any system that is a part of a workspace developer console for bringing different kinds of user applications and contexts together.

The score generator 312 can infer the values of the adjustable variables or attributes of the microapp to perform a score calculation. The score generator 312 can be triggered to calculate a score responsive to an indication from an administrator, such as an interaction with a "calculate" button or other interactive elements. The score generator 312 can calculate a score for a microapp responsive to at least a change or an adjustment to the adjustable variable (or the attribute). For example, an administrator can access a developer console to configure the adjustable variable. The adjustment can change the value of the adjustable variable, such as the value of the design component, the complexity level of the microapp, user effort level to complete the task, etc. In some cases, the score generator 312 can calculate a score on an individual basis, such as assigning a first score to a microapp for a first user and a second score to the same microapp for a second user. This calculation can be based on the difference in user activities, characteristics, or identity, for example. The score generator 312 can rely on a machine learning manager 320 to determine the values of the microapp attributes. For example, the microapp manager 308 can forward the attributes to the machine learning manager 320. The score generator 312 can receive an output from the machine learning manager 320 to calculate a score for the microapp.

In some cases, the score generator 312 may not rely on at least one input or value set by the administrator. For example, the score generator 312 may not incorporate historical activities of the microapp, complexity level, or user effort as part of the score calculation. Even without at least one of the values or attributes, the score generator 312 can aggregate the available values to output an aggregated score. The score generator 312 can assign the score to individual activities related to the application or all activities related to the application. By assigning the score to individual activities, the user can obtain the respective score associated with the completed activity. By assigning the score to all activities, the user can obtain the score responsive to completing all activities (e.g., a part of the score can be provided upon reaching a threshold of each activity).

For example, the score generator 312 can use the values of one or more attributes configured by the administrator, such as microapp design components numbers, complexity numeric inputs, business value outcomes, impact, or relevance. The score generator 312 can align the values or the attributes based on the range of scores (e.g., predetermined by the administrator or dynamically determined based on weights of each attribute). For example, if the sum of all the numeric inputs is greater than or equal to 0 and less than 5, the microapp can be assigned a score of 1, if greater than or equal to 5 and less than 10, the microapp can be assigned a score of 2, etc. The score can be capped, such that the microapp may not be assigned a score greater than a maximum.

The score generator 312 can calculate the microapp scores/points by multiplying the sum of a first set of values and the sum of a second set values. The first set of values can include one or more microapp design components. The second set of values can include one or more microapp use case inputs. One or more values from each set of values can be interchanged to perform the calculation. For example, the score generator 312 can multiple the sum of the values for (microapp notifications, action buttons, review and approval workflows, number of user input entries, effort, dependencies, and relevance) and the sum of the values for (business value proposition, time save target, and end-user impact). At least one of the aforementioned values can be scaled, for example to a factor of 1-5. The score generator 312 can calculate a score for standard business value metrics (e.g., importance or how valuable the task/microapp completion is for the company). The following formula can be used for the calculation: Standard Business Value Metrics Score= (Value−Mean of this value in all Microapps)/(Standard Deviation).

The score generator 312 can include or be a part of an analytics service system to perform the calculation of the microapp score. For example, the score generator 312 can account for the inputs from the events (e.g., generated when a new microapp is deployed by the microapp manager 308) and the desired customization inputs from the administrator. The administrator can send the custom inputs via an application programming interface ("API") request configured to send data to the source application. In some cases, the rules or logic can be selected or changed by the administrator of the workspace platform. The administrator can select the rules or logic at the time of the request to assign a score to a microapp. Once generated, the score generator 312 can respond to the microapp manager 308 with the microapp score, where the microapp manager 308 can assign or link the score to their respective microapp, for example.

In some cases, the score generator 312 can incorporate features or output from at least one machine learning model to generate a score for individuals independently. For example, the score generator 312 can decide the score for individual microapps based on the individual use case or a specific set of users (e.g., user account type). The individual use case can refer to the tasks assigned to be completed using the microapp. The specific set of users can refer to different types of accounts launching the microapp. Therefore, individual microapps can be customized or otherwise specifically tailored to users and the user group can be limited to specific lines of business (e.g., limited usage for a subset of available microapps).

In some cases, the score generator 312 can utilize multiple score rules or logic. For example, the score generator 312 can determine or otherwise calculate the score for individual microapps using a first equation (or process) and a second equation. Different equations or rules can utilize different sets of values. The score generator 312 can provide multiple calculated or otherwise determined scores for the administrator to select. The score generator 312 can combine scores generated using different equations or rules to determine the mean, median, minimum, maximum, or mode of the scores. The score generator 312 can select at least one of the scores to assign the microapp.

The DPS 301 can include an activity manager 316 to monitor the activities of one or more users. The activity manager 316 can be implemented in hardware, software, or a combination thereof. The activity manager 316 can be a software engine or a module to calculate the microapp score. The activity manager 316 can monitor the activities or actions of users using the microapp, for example, as an intermediary between the client and the workspace platform. The activity manager 316 can forward input data to the application. The activity manager 316 can receive or record activities of the user via a script or program executing in the background of the application. In some cases, the activity manager 316 can be a daemon operating in the background of the application (or on the workspace platform) to monitor the activities. The activities of the user can include any user interactions within the application, such as mouse clicks, keypresses, duration of the user using the microapp, duration idled (e.g., user can be considered idle after 5 minutes or other predetermined time of inactivity), total tasks completed, among interactions or engagement of the user to the microapp. The activity manager 316 can store the activity data in the historical data 344.

The activity manager 316 can include or be a part of an analytics service system. For example, the activity manager 316 can process user activity data to determine indications of user behavior, user preference, relevance, application usage-related information, among other actions or performance by users. The activity manager 316 can store these indications in the client data storage 332 or the historical data storage 344. Further, the activity manager 316 can send these indications to the machine learning manager 320, where the machine learning manager 320 can determine or adjust the score of individual microapps (e.g., specific to the user or a group of users with similar behavioral patterns) or the weight of the one or more attributes used to calculate the score for the microapp. For example, the activity manager 316 can behavioral analysis (or send data to machine learning manager 320 using a machine learning model). Based on the analysis, the activity manager 316 can identify that a group of users (e.g., similar account type) spends more time on a first microapp with low business value than a second microapp with a high business value, thereby not completing as many tasks with high business values. To encourage the group of users to complete higher valued tasks or more urgent tasks, the activity manager 316 can notify the score generator 312 to generate a lowered score for the first microapp appropriate based on the popularity or the number of users using the microapp and/or generate a higher score for the second microapp to encourage or enhance user engagement to the microapp. In some cases, by increasing the score, the microapp manager 308 can launch the second microapp responsive to at least one user of the group of users initiating the workspace.

In some cases, the activity manager 316 can determine user behavior based on the score assigned to the microapp or the end-user score obtained throughout the workspace. In addition to user behavior, the activity manager 316 can determine user preference, productivity, or adoption analytics. Similar analysis can be performed for other users of the workspace platform. For example, the activity manager 316 can identify what microapps the user often used and the score associated with those microapps. If the user often launches microapps presented with higher scores and the user is one of the top scorers (e.g., compared to other users within the workspace), the activity manager 316 can determine that the user completes tasks marked or assigned with the highest score values.

In another example, the activity manager 316 can identify that a user often launches microapps assigned with low scores. The activity manager 316 can determine that the user is also one of the top scorers by comparing the accumulated scores of all users on the workspace platform. The activity manager 316 can identify that the user spends a small amount of time to complete the tasks of the microapp (e.g., 50% less time than, and gain a score equating to 60% of, the more complex microapp). The activity manager 316 can determine that the user is motivated to collect points by completing smaller, less intensive/complex tasks, for example, based on historical activities of completed tasks and points collected by the user. As such, the activity manager 316 can provide this determination or indication to the microapp manager 308 to launch, pre-store data, or prioritize more microapps with lower complexity for the user. In some cases, the microapp manager 308 can decrease the score of those microapps with less complexity, such as balancing the user effort to how much score should be obtained. If the user effort or microapp complexity attributes are weighted higher than other attributes, the microapp manager 308 can further reduce scores for less complex microapp. In this case, users performing low-level, less complex tasks to earn scores can be encouraged to attempt more complex tasks, thereby enhancing user engagement with other microapps. The activity manager 316 can identify other patterns for users, such as at least the types of microapps launched, when those microapps launch, the duration of the user participating in the microapp, or activities performed in the microapps.

The activity manager 316 can monitor individual activities of the user to determine if a threshold (e.g., an activity threshold) is satisfied. For example, the microapp manager 308 can split the generated score into multiple portions and assign different portions to one or more tasks within the microapp. The activity manager 316 can monitor and determine whether the user completes the one or more tasks. The score assigned to individual tasks (or group of tasks) in the microapp may or may not be equalized. For example, more complex tasks can be assigned a higher score, such that the score obtained from the microapp reflects the contribution or effort the user put into completing tasks of the microapp. The tasks of the microapp can include answering questions, typing out one or more sections of a document (e.g., abstract, summary, experimental calculation, detailed explanation, body paragraphs, etc.), recording work time, annotating tasks performed throughout the workday, prepare news or announcement to colleagues, ticket submission (e.g., feedback about the system or issues experienced), among others. In this case, the threshold can include a part of the task mentioned above, such as completing a portion of the document, quality of the annotation, etc. The activity manager 316 can forward the user activity to the microapp manager 308, thereby providing at least a portion of the score to the user based on the effort or amount of tasks completed within the microapp.

Further from the above, the activity manager 316 can use any behavioral analysis or pattern recognition techniques to construct a characteristic for individual users. The activity manager 316 can relay or forward the characteristic information of individual users to other components of the DPS 301 to calculate, determine, or adjust the score for one or more microapps. The activity manager 316 can provide insights about employees to administrators (e.g., manager, supervisor, or other groups of users having authoritative privilege over the employee user group). The insight can include their interest and expertise. For example, the activity manager 316 can identify the user's strengths (or weaknesses) based on time to complete a task or quality of the completed task, the tasks completed in the microapp.

The DPS 301 can include a machine learning manager 320 to predict microapps users are likely to launch, among others. The machine learning manager 320 can utilize one or more machine learning models from the model storage 352. The machine learning model can be trained using at least one machine learning technique and inputs received from one or more components within the system 300 or the DPS 301, for example. The machine learning manager 320 can be referred to as a machine learning engine, a machine learning trainer, or generally, a device/component using a machine learning model to output processed information. The machine learning model can predict at least one microapp a user is likely to launch when accessing the workspace. The prediction can be based on historical user activities (e.g., application launches, activities within the microapps, scores assigned to the microapps, etc.)

The machine learning manager 320 can use at least one machine learning model to assist or facilitate the calculation of microapp scores. For example, the machine learning model can use NLP on at least the description of the microapp (or the title of the microapp) acquired as input from the administrator. The machine learning model can be trained using descriptions of other microapps and their associated scores or values of the attributes. The machine learning model can process the description to determine, predict, or assign the values of the one or more microapp attributes (e.g., relevance to the type of user, business value, complexity of the assignment or task, etc.). The values can then be used by the score generator 312 to calculate a score, and the microapp manager 308 can update or assign the calculated score to the microapp. In some cases, the machine learning model can directly determine a score to assign the microapp based on information received from one or more components of the DPS 301. For example, instead of updating the values of the attributes and forwarding the updated values for the score generator 312, the machine learning manager 320 can provide an updated score to the microapp manager 308. In this example, the machine learning manager 320 can update the score for microapps after a period of time (e.g., a predetermined time or cycle, such as a day, a week, or when user re-instantiates the workspace).

The machine learning model can determine the complexity of one or more tasks within the microapp. For example, the machine learning model can receive the activity data of users from the activity manager 316. The machine learning model can identify at least the time spent on the task (e.g., user effort), quality of the completed task, how much training users have before performing the task, issues identified, group of users targeted, or number of action buttons. Based on at least these activities or performance, the machine learning model can assign a complexity level to the microapp. The complexity level can increase or decrease the score assigned to the microapp, such as by the microapp manager 308. The machine learning model can perform other operations to configure the values of the microapp attributes, the score for microapps, predict which microapp to launch or pre-store data to speed up access time to the application. Based on user activities, end-user collected scores (e.g., which can indicate a level of expertise in using microapps or the workspace in general), or microapp scores, the machine learning model can be used to avoid falsely instantiating incorrect microapps for users.

The DPS 301 can include a UI manager 324 to provide an interface of the workspace, an interface of the microapp, handles push notifications, or provide other visual presentations to the user. After launching the workspace, the user can be presented with the workspace interface. Administrators (e.g., people that design, develop, or deploy microapps) and other users (e.g., those who use the workspace, target audience for the scored microapps, employees, etc.) can be presented with different interfaces or features of the workspace. For example, the UI manager 324 can present the user with microapps available for access, scores assigned to the microapps (e.g., some microapps may not have a score), tabs, links, icons, search bar, a user profile image, total accumulated scores, indication of notification (or notification), etc. The UI manager 324 can present an interface with the roles or account type of the user. The UI manager 324 can provide other interactive elements for the user for redirection or navigation throughout the workspace. In some cases, the UI manager 324 can present images or indications of rewards available for users based on total scores accumulated. The rewards can include at least one of a gift card, a coupon, promotion, plane ticket, etc. The UI manager 324 can provide an interactive link to the user to retrieve at least one reward if the user satisfies a threshold for receiving the reward (e.g., the total score is satisfied).

In another example, the UI manager 324 can present an administrator interface to an administrator. The administrator interface can differ from the user interface. In some cases, the administrator interface can be referred to generally as another user interface. The administrator interface can include at least management tabs (or windows or section), point/score calculation or assignment tab, employee overview tab, performance tab, etc. The administrator interface can include interactive elements, buttons, or other features of the user interface. The administrator interface can be provided to the administrator or developer account types.

The UI manager 324 can provide a link or a tab to view the ranking or leaderboard of users of the workspace. For example, the UI manager 324 can display the users within the ranking sorted based on the accumulated scores of each user. The user can be identified by a nickname, user identifier, full name, or other identifiers set by the user. The UI manager 324 can provide the administrator with the full name of users, such as to determine the top performer, increasing recognition for one or more users. The UI manager 324 can display the levels of each user, where the levels of the users can be based on at least the score, user activities in the workspace, or other historical activity data or performance metrics. The UI manager 324 can rank or sort the users based on their levels in the leaderboard. The UI manager 324 can display top users for different microapps, categories of microapps, types of users, among other categorizations. The UI manager 324 can retrieve the score data, notification data, or client data from the data repository 328. The UI manager 324 can provide score analytics, such as a summary or details of user accomplishment, achievement, titles, badges (e.g., obtain from performing a predetermined feat or tasks indicated by administrators), the average score obtained per day, etc.

The UI manager 324 can manage notifications shown to the user or administrator. For example, when calculating or assigning scores to microapps, the UI manager 324 can present the calculated score to the administrator interface. The UI manager 324 can present the score adjacent to or on the microapp (e.g., a frame or a portion of the workspace presenting the microapp) at the user interface. When a user obtains a score from satisfying at least an activity threshold within the microapp, the UI manager 324 can send a notification to the user indicating at least the score obtained from completing the task or the accumulated scores. The UI manager 324 can provide a notification to the user indicating any incomplete tasks or urgent tasks for the user to complete. The UI manager 324 can provide other notifications to encourage the user to perform actions in the microapp, such as to complete an objective or adopt the microapp in their day-to-day work.

The UI manager 324 can provide prompts, push notifications, or pop-up blocks. The prompts can include interactive elements requesting user interaction (e.g., terminate the prompt, answer a question, etc.). For example, prior to automatically launching the application, the user interface manager 324 can prompt the user to accept or reject the launch. By rejecting the launch, the UI manager 324 can close the prompt without presenting the microapp. By accepting the launch, the UI manager 324 can present the instantiated microapp after closing the prompt. The UI manager 324 can provide other visual or graphical presentations to users, such as in conjunction with FIGS. 5-8.

The DPS 301 can perform other features and functionalities using the components described above to at least prioritize microapps, predict microapps to launch, determine or configure scores for microapps, assign scores for microapps or objectives within the microapps, retrieve or pre-store application data from SoR based on predicted microapp launch, or provide rewards to users based on the collected points. The DPS 301 can combine different kinds of user applications and contexts within a workspace for ease of access and an increase in efficiency and productivity. The DPS 301 can take into account the user geography, user group, nature of the work performed by the users, score collected by the user, or rank of the user to determine the engagement of the workspace. Taking the above into account, the DPS 301 can configure scores for microapps used by the users accordingly, such as changes in the attribute values or weights assigned to the microapp attributes. Further, the DPS 301 can derive work-area of inclination (e.g., fields or areas of work preferred by the user), top scorer for specific nature of work, the highly user-intensive work areas, applications frequently used, or top scores for high demand work from the microapp score. The DPS 301 can use the microapp score for other microapps with similar attributes, for example.

The DPS 301 can include or be a part of a workspace managing system to unify different applications that users or administrators use. The workspace can include applications from different industries, businesses, nature, or usage, which can be assigned scores using a uniform scale of comparison (e.g., thereby assigning appropriate scores for applications from different fields, etc.). In other words, the DPS 301 can bring a wide assortment of work tasks with several lines of businesses and users together into a modified idea of application prioritization and scoring, where diverse applications can be assigned scores and compared on the same platform. The DPS 301 can use combinations of at least physical components of the microapp, business impact to end users, time save rate (e.g., as compared to using SoRs or source application), usage complexity, or workflow levels to calculate scores for applications within the workspace. The DPS 301 can calculate the score based on the overall value or effort involved in the process to complete an objective when using the application. The DPS 301 can provision a custom admin-entered input field to collect these process-level and business-value level details from the administrator for microapp score calculation. Therefore, the processes to calculate the score can be made dynamic (e.g., not statically determined).

The DPS 301 can calculate or otherwise determine scores using descriptions entered for the application by administrators, such as to calculate or determine scores even when value-centric inputs may be unavailable. The DPS 301 can apply a machine learning model to perform the predictions and calculations. The DPS 301 can manage workspaces in any area, such as education or onboarding within an organization, in all day-to-day tasks, for customers in other industries, among others. The DPS 301 can boost user engagement in completing objectives, adoption of applications, and productivity using microapps instead of SoRs. Thus, the DPS 301, the one or more components of the DPS 301, or the devices within the system 300 can perform features and functionalities described above to facilitate a score-oriented experience in workspace microapps, increase the efficiency of launching microapps, improve access time to applications, decrease resource consumption for the workspace via prioritization of a microapp for the user to complete, thereby reducing multiple instantiations of the microapp to complete the task, enhance user engagement within applications, and avoid instantiating applications user may not use/launch.

Figure 4:
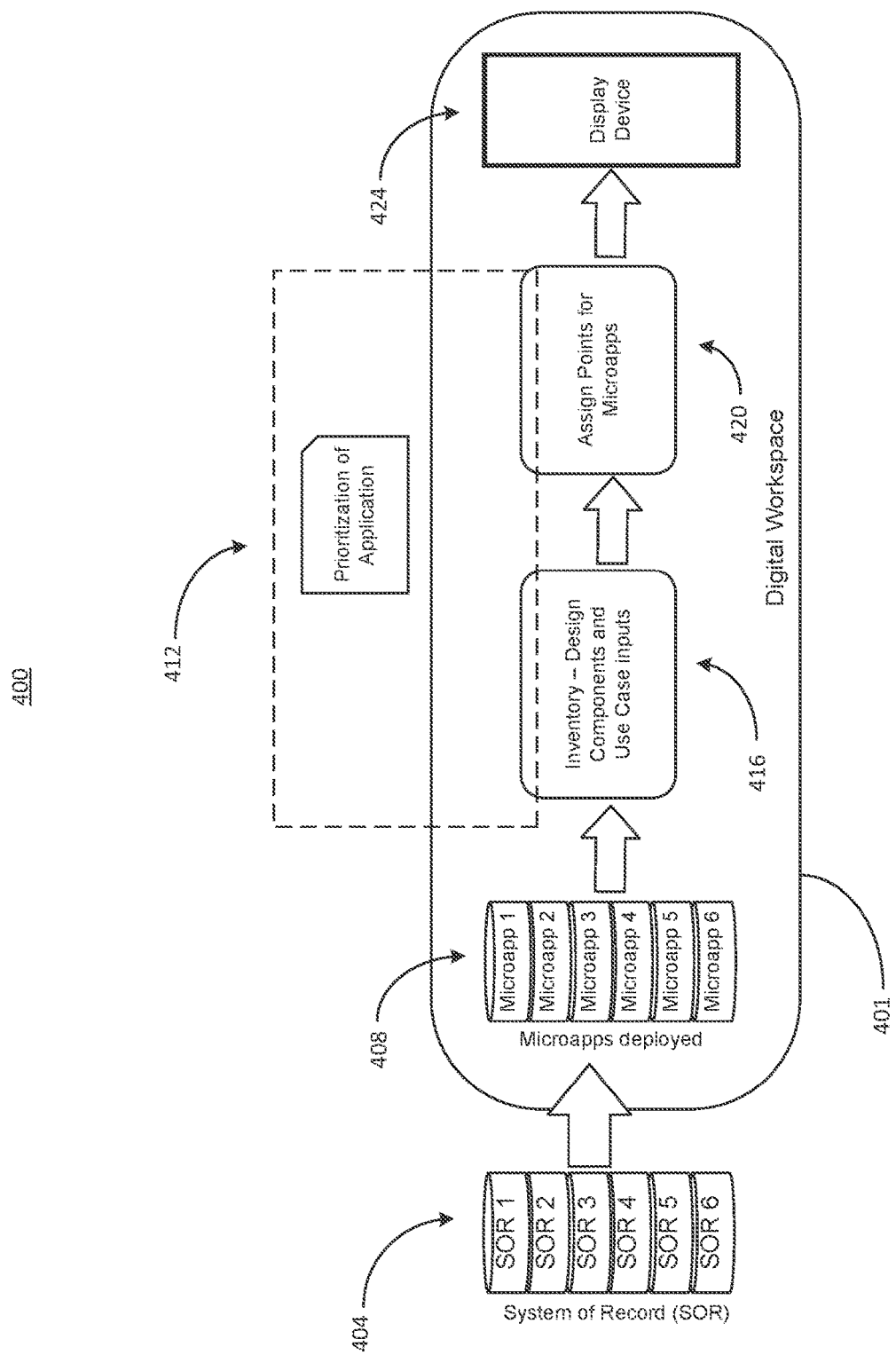
FIG. 4 is an example flowchart for prioritization of microapp in a digital workspace, in accordance with one or more implementations.

FIG. 4 illustrates an example flowchart for prioritization of microapp in a digital workspace, in accordance with one or more implementations. Example operations described in illustration 400 can be executed, performed, or otherwise carried out by one or more components of the system 300 (e.g., DPS 301, network 302, client device(s) 303, or cloud 360), the computer 101, the cloud computing environment 214, or any other computing devices described herein in conjunction with FIGS. 1A-2C. The illustration 400 can include at least one digital workspace 401 (e.g., generally referred to as a workspace), at least one SoR 404, at least one microapp 408, block 412, block 416, block 420, and a display device 424. The blocks 412, 416, and 420 can be steps or operations performed in the system. The illustration 400 can represent the systems and methods fit a bigger scheme to perform features and functionalities described herein, such as score calculation, user engagement enhancement, application prioritization, etc.

The SoR 404 can refer to source applications where data for microapps are derived from. The SoR 404 can be used by the DPS (e.g., DPS 301) to update, extract, install, or deploy microapps 408 within the workspace 401. At block 412, the DPS can prioritize microapps within the workspace using microapp inventory and score assignments to the applications. For example, within the workspace 401, individual microapps can include an inventory (e.g., a list of attributes or adjustable variables for administrators or developers of the microapps) as in block 416. The DPS can retrieve and configure the inventory presented in the workspace. The inventory can include design components and use case inputs for each application. Design components and use case inputs can be associated with a value. The DPS can sum the values of the design components and the values of the use case inputs. The DPS can multiply the two sums to calculate or otherwise determine a score, such as at block 420. Further at block 420, the DPS can assign, indicate or otherwise identify the score to the microapp having attributes of the inventory. The DPS can prioritize one or more applications based on their assigned scores. The DPS can include the microapps within the user interface. The user interface of the workspace 401 can be presented to the display device 424 of the client devices (e.g., client devices 303). The user interface can include scores associated with the microapps and scores accumulated by the user.

Figure 5:
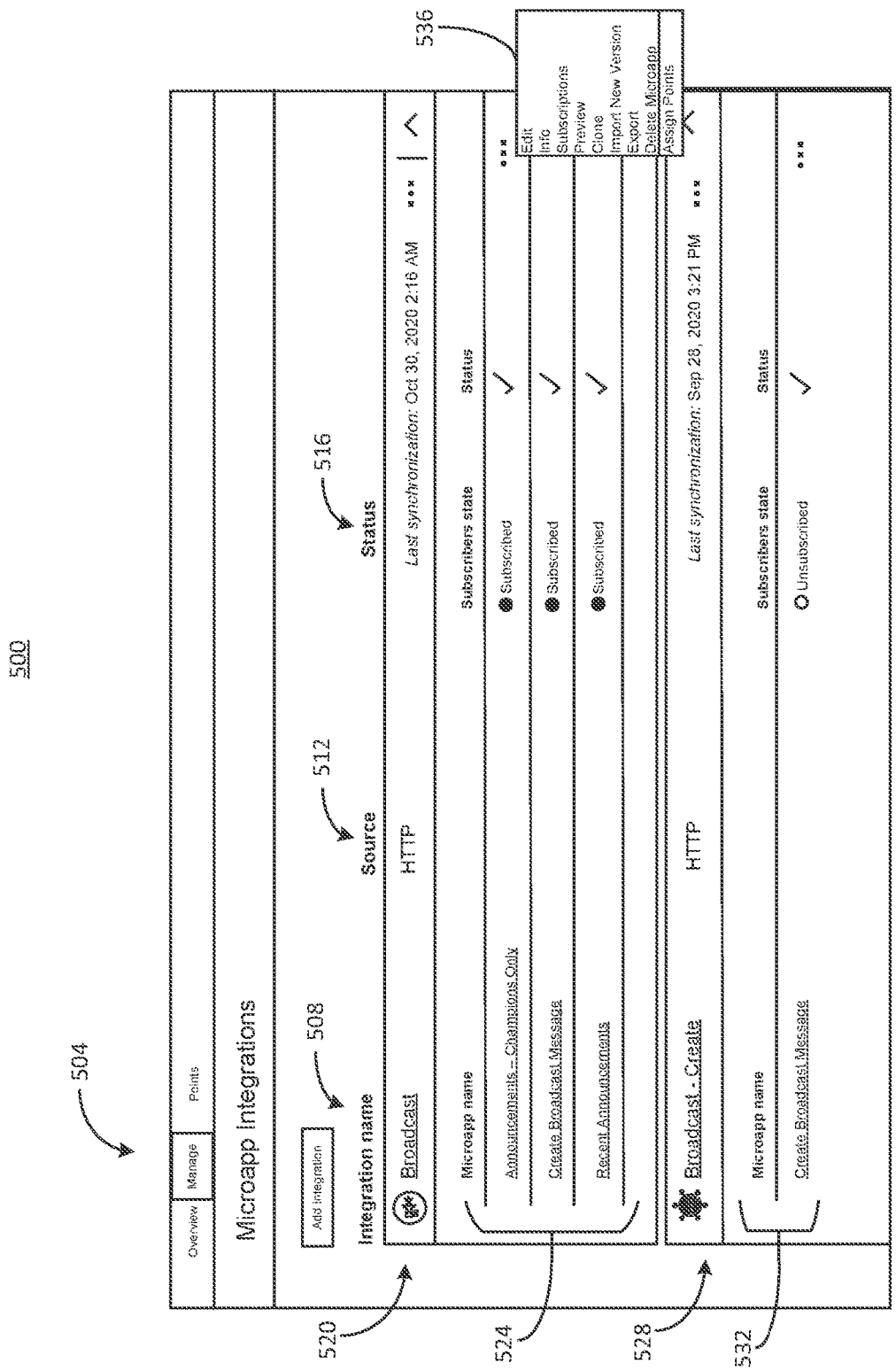
FIG. 5 is an example illustration of a workspace microapp builder, in accordance with one or more implementations.

FIG. 5 illustrates an example illustration of a workspace microapp builder, in accordance with one or more implementations. Example operations described in illustration 500 can be executed, performed, or otherwise carried out by one or more components of the system 300 (e.g., DPS 301, network 302, client device(s) 303, or cloud 360), the computer 101, the cloud computing environment 214, or any other computing devices described herein in conjunction with FIGS. 1A-2C. The illustration 500 can include at least one tab 504, one or more headings (e.g., categories 508, 512, or 516), at least one integrated SoR (e.g., integration 520 or integration 528), various microapps (e.g., microapps 524 and microapp 532), and menu 536 (e.g., options or pop-up box). The illustration 500 can include a user interface of an administrator presented to the client device. The illustration 500 can include a microapps builder presented within a digital workspace platform.

For example, the tab 504 can include at least an overview tab, manage tab, and points tab. The overview tab can include the home or main page of the workspace (not shown). The manage tab can be used by administrators to manage existing microapp, integrate with other SoRs to add microapps, assign points to one or more microapps, etc. Within the manage tab, the user interface can include information on individual integrated SoRs. For example, category 508 can include integration name (e.g., broadcast management application or broadcast creation application), category 512 can include the source of the integration (e.g., hyptertext transfer protocol ("HTTP"), network time protocol ("NTP"), etc.), and category 516 can include update status of the application (e.g., last sync time). The example broadcast management application (e.g., integration 520) can include three microapps 524 having various core functions of the source application, such as managing announcement for champions (e.g., top scorers or top-ranked users), creating broadcast messages, or viewing recent announcements. Each user can subscribe to each microapp, such as for presentation within the overview tab for quick access/launch. For each microapp, the status can indicate whether the microapp is up-to-date (e.g., indicated by a checkmark) or out-of-date (e.g., requires updates, presented using a different marker, such as an "X"). Each row of microapp can include an associated menu icon. By interacting with the menu icon, the user can be presented with the menu 536, for example.

Similar to integration 520, integration 528 can include at least one microapp 532 associated with broadcast creation application (e.g., source application). The microapp 532 can be a create broadcast message or other notification microapp. The user may have unsubscribed or not yet subscribed to the microapp 532, indicated by the subscribers state. The subscriber state can indicate whether one or more users other than the administrator is subscribed to the microapps. Similar to the above, the microapp 532 can include a menu icon. For example, responsive to interacting with the menu icon, the menu 536 (or other similar menus) can appear on the user interface. The administrator can provide an indication of interaction with at least one element of the menu 536, such as the "assign points" element. Responsive to the interaction, the client device 303 can be redirected to a different tab or window. In some cases, the DPS (e.g., DPS 301) can generate a new tab/window responsive to the user interaction with at least one element in the menu. In some other cases, the client device can be redirected to an existing tab/window. Further, the integrated applications or microapps (e.g., 520, 524, 528, and 532) can be presented in other users' workspace overview, in conjunction with FIGS. 7-8.

FIG. 6 illustrates an example illustration of a workspace microapp adjustable variables, in accordance with one or more implementations. Example operations described in illustration 600 can be executed, performed, or otherwise carried out by one or more components of the system 300 (e.g., DPS 301, network 302, client device(s) 303, or cloud 360), the computer 101, the cloud computing environment 214, or any other computing devices described herein in conjunction with FIGS. 1A-2C. The illustration 600 can include at least one tab 604 (e.g., similar to tab 504) including, but not limited to, overview tab, manage tab, or points tab for assigning points to at least one microapp. The illustration 600 can include various adjustable variables 608 (e.g., attributes or configuration of a microapp), a button 612 (e.g., calculate button), and a notification 616.

In this example, the illustration 600 can present a user interface of a client device (e.g., administrator device) in the points assignment tab. The DPS can redirect or present this tab to the user responsive to the administrator interaction with the "assign points" option, in conjunction with FIG. 5 or if the administrator selects the points tab. The notification 616 can indicate the calculated or otherwise determined score for the microapp. The notification 616 can be presented or refreshed responsive to at least one of calculating the score, calculating a new score, or an indication of interaction by the administrator with the button 612. The adjustable variables 608 can include at least microapp design components and use case inputs. The microapp design components can include at least integration title, microapp title, microapp description, microapp type (e.g., action, notification, or both), number of action buttons, number of notifications, workflow reviews (e.g., whether the workflow will be reviewed by other users), number of user input expected, and user effort. The use case inputs can include at least the target persona (e.g., types of user accounts, such as a specific field, or all types of employees), number of known or open issues, number of dependencies (e.g., systems or teams to complete tasks in the microapp), end-user relevance (e.g., how relevant is the microapp to users), business impact (e.g., values microapp has on business objective), matching SoR look/feel (e.g., indicating ease of transition from the SoR to the microapp, expected user to be trained for usage, number of expected user, transaction per day, and time-save per transaction (e.g., time saved from using microapp instead of source application).

The DPS (e.g., DPS 301) or analytics service component can calculate the score responsive to the administrator interacting with the button 612. Responsive to an event can refer to shortly after or immediately after the event, such as 1 ms, 10 ms, or 50 ms afterwards, based on the processing speed of the computer (e.g., the DPS or computer 101). In some cases, the DPS can calculate the score responsive to adjusting one or more variables 608. The DPS can assign the score to the microapp responsive to calculating the score. In some cases, the DPS can assign the score to the microapp responsive to interacting with the button 612. Once a score is calculated, the DPS can present the notification 616 indicating the calculated score. The presented score can be the score assigned to the microapp. In some cases, the score can be adjusted per individual case, such that each user using the same microapp may be presented with a different score. For example, the user can be presented with a different score based on the time user completed tasks in the microapp (e.g., late completion can reduce available scores). The score assigned to the microapp can change while the user is in the microapp. For example, the DPS can progressively decrease the score as time passes. The administrator can assign weights to the attributes, such that the score is calculated more heavily based on the value of at least a specific attribute (e.g., user effort, business impact, etc.). For example, the weight can be a multiplier to the value set by the administrator. If the multiplier is 3 and user effort is set to 1, the value of the user effort can be 3 when calculating the total score. In further example, if user effort is set to 5, the value of the user effort can be 15 when calculating the score.

Figure 7:
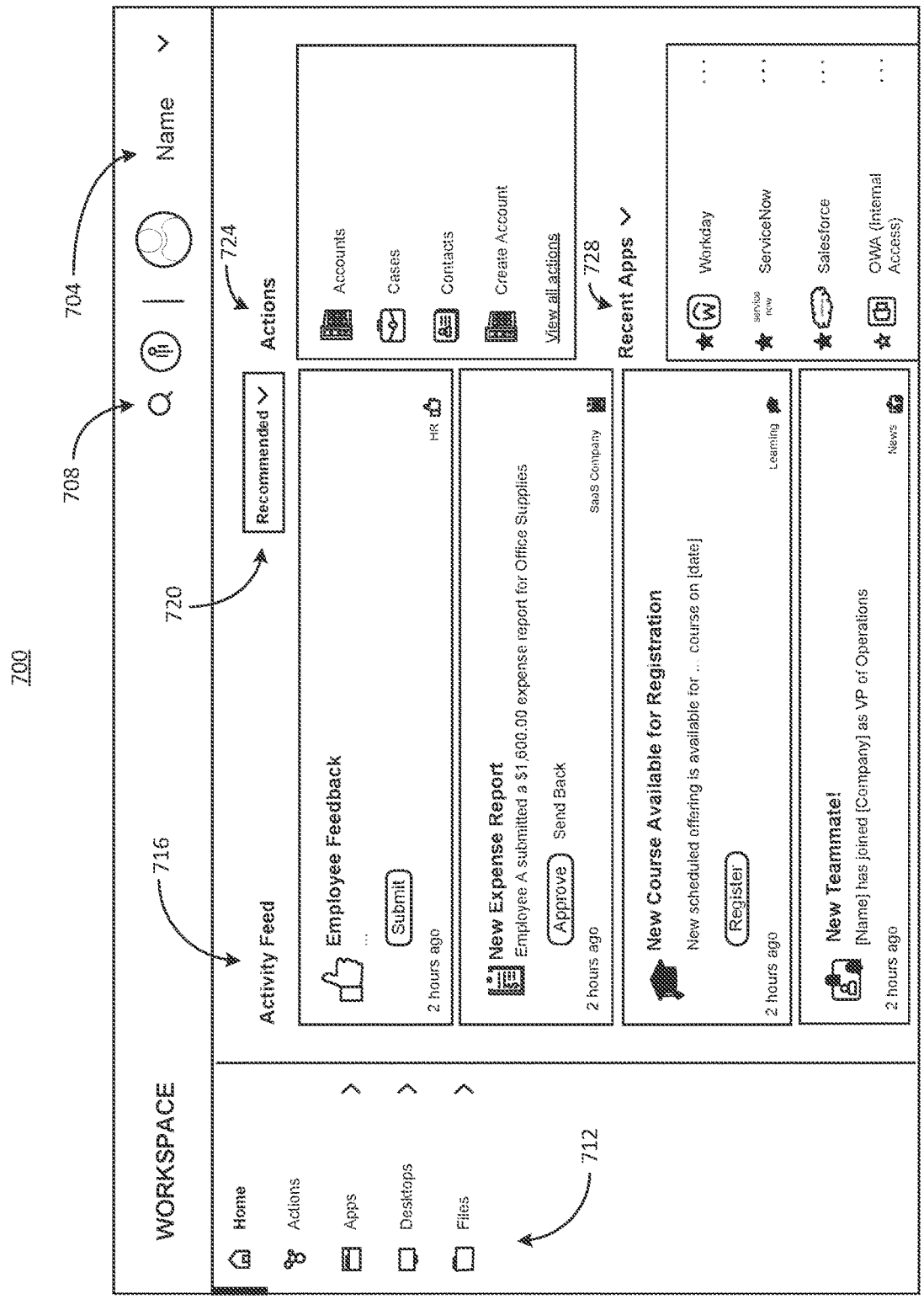
FIG. 7 is an example illustration of an end-user interface, in accordance with one or more implementations.

FIG. 7 illustrates an example intelligent end-user interface, in accordance with one or more implementations. Example operations described in illustration 700 can be executed, performed, or otherwise carried out by one or more components of the system 300 (e.g., DPS 301, network 302, client device(s) 303, or cloud 360), the computer 101, the cloud computing environment 214, or any other computing devices described herein in conjunction with FIGS. 1A-2C. The illustration 700 can include an example end-user interface (e.g., generally referred to as a user interface). The user interface can be presented to the user within the workspace. The user interface can include the name 704 of the account owner (e.g., user name or identification), search bar 708, and at least one tab 712 (e.g., home, action, apps, desktops, files, among others). Under the home tab, the user interface can include activity feed 716, sorting menu 720, actions 724, and recent applications 728. The user interface can include other icons, features, or elements for enhancing user engagement and navigation experience within the workspace.

The search bar 708 can be used to search applications, microapps, files, or other content available in the workspace (e.g., available for user access). In illustration 700, the home tab can be selected to present an overview of microapps and other actions the user could perform. The activity feeds 716 can include prioritized microapps for the user to complete and their respective source applications (e.g., HR application, SaaS application, learning application, or news application). Within the activity feeds 716, the DPS (e.g., DPS 301) can retrieve application data from the SoR. The user can interact or perform tasks directly on the activity feed 716 without fully launching individual microapps. For example, the DPS can indicate to the user to complete an employee feedback survey. The user can type on the activity feed and interact with the submit button to complete the feedback survey. Other example activities can include approving a new expense report, registration for a course, or other announcements which can be relevant to the user.

The sorting menu 720 can be defaulted to suggesting (e.g., providing or prioritizing) one or more microapps for users to complete. The suggested applications can be based on historical user activities, score assigned to the microapp, or time remaining to complete the tasks. Other sorting options can include sort by name/title, fields of microapp, source application, or other sorting methods. The actions 724 can include basic actions for managing user account or activities on the account, such as accessing account information, case history (e.g., pending or closed cases), contact list, or create an account (e.g., account for linking source application). In some cases, the source application can be linked to the same user account as the workspace platform. The recent applications 728 can include one or more applications most recently accessed by the user. The user can mark each microapp as a favorite which can appear under a different tab 712, such as a favorite tab (not shown).

Figure 8:
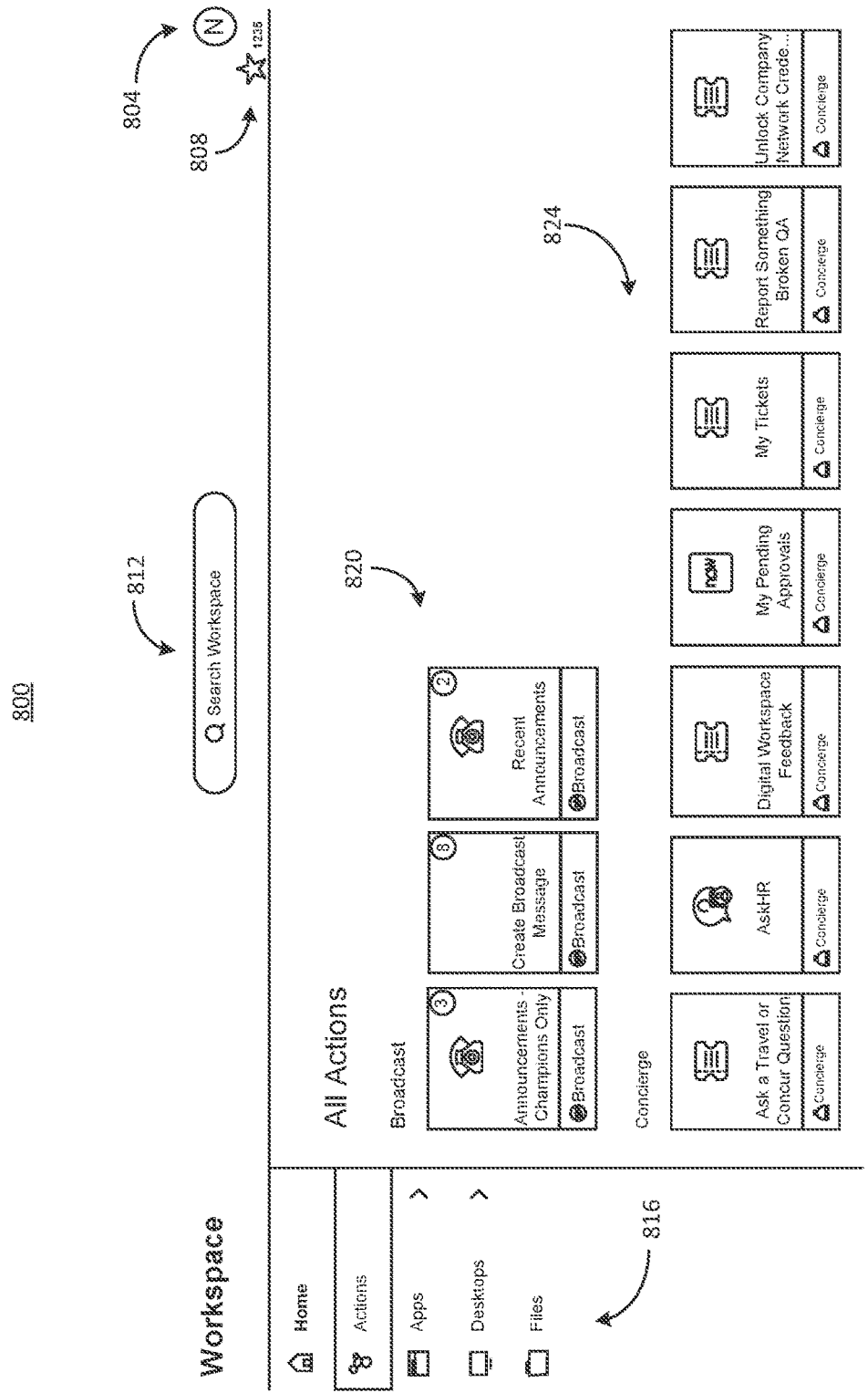
FIG. 8 is an example illustration of an end-user interface with microapps and user scores, in accordance with one or more implementations.

FIG. 8 illustrates an example end-user interface with microapps and user scores, in accordance with one or more implementations. Example operations described in illustration 800 can be executed, performed, or otherwise carried out by one or more components of the system 300 (e.g., DPS 301, network 302, client device(s) 303, or cloud 360), the computer 101, the cloud computing environment 214, or any other computing devices described herein in conjunction with FIGS. 1A-2C. The illustration 800 can include a user interface of a workspace. The illustration 800 can include a user icon 804 (e.g., can include user initial, similar to name 704), a score 808 (e.g., a counter of accumulated points), a search bar 812 (e.g., similar to the search bar 708), and at least one tab 816 (e.g., similar to tab 712). In example illustration 800, the action tab can be selected from the tab 816. Under the action tab, the user interface can include all available actions or microapps for the user, such as broadcast microapps 820 or concierge microapps 824. The broadcast microapps 820 can include announcement—for champions only, create broadcast message, or recent announcement microapps. The concierge 824 microapps can include questions, ticket management, feedback, or company network credential management microapps.

The DPS (e.g., DPS 301) can launch a corresponding application subsequent to user interaction with the microapp icon presented in the user interface. In some cases, the listing of microapps can be based on priority, score, or user relevance. The user can configure the arrangement of microapps within the user interface. The DPS can provide users with a custom arrangement, default arrangement, or other arrangement options to improve ease of access for the user and enhance user engagement or adoption of microapps in the workspace. The score 808 can represent the total scores accumulated by the user by completing tasks within the applications.

Figure 9:
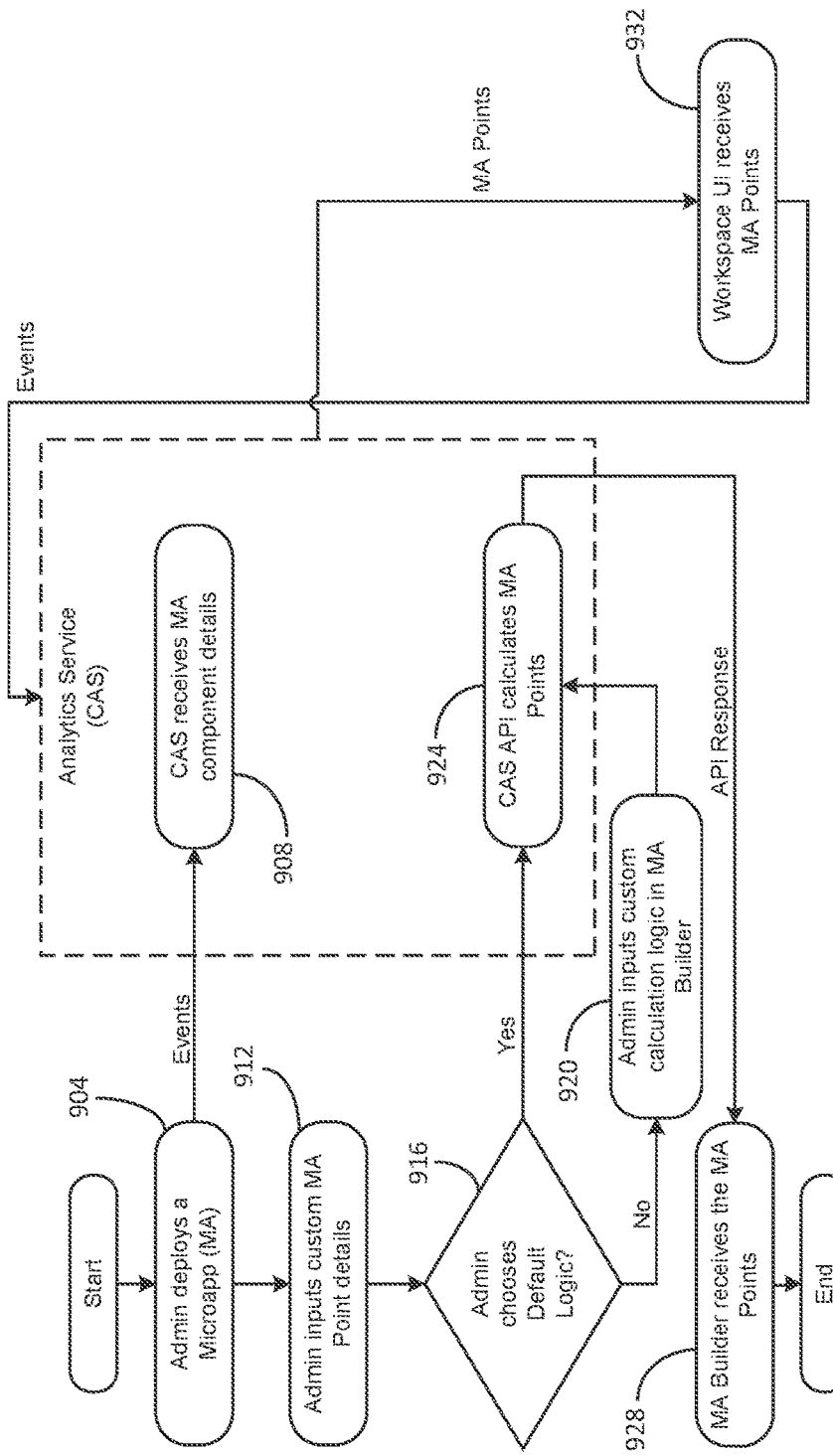
FIG. 9 is an example high-level workflow diagram, in accordance with one or more implementations.

FIG. 9 illustrates an example high-level workflow diagram, in accordance with one or more implementations. The example operations described in diagram 900 can be executed, performed, or otherwise carried out by one or more components of the system 300 (e.g., DPS 301, network 302, client device(s) 303, or cloud 360), the computer 101, the cloud computing environment 214, or any other computing devices described herein in conjunction with FIGS. 1A-2C. The diagram 900 can include a method for assigning scores for a microapp and deploying the microapp for users. The diagram 900 can include an administrator deploying a microapp (e.g., "MA") at step 904. To deploy the MA, the administrator can add integration of SoR or source application into the workspace. The administrator can edit the microapp via a menu bar, such as to configure values of one or more adjustable variables of the MA.

At step 908, the DPS (e.g., DPS 301) managing the workspace can transmit the component details of the microapp to the analytics service ("CAS"). The CAS can receive the MA components details, such as the MA design components. The CAS can receive inputs provided by the administrator or other devices as an event to adjust the MA score. The CAS can be a part of the DPS or at least one component of the DPS to calculate and provide MA scores. At step 912, the administrator can input custom MA point details. The custom MA point details can include use case inputs from the administrator (or developer). The values of the custom MA point details can be configured by the administrator. Any changes to the design component or custom MA points detail can be sent as events to the CAS. The CAS can receive updates to the design components and MA points detail to calculate, refresh, or re-calculate the MA scores.

At step 916, the DPS can determine whether the administrator chooses to use default logic. The default logic can refer to the use of default values for MA components details and the MA point details. The default values for the MA attributes can be assigned during registration or integration of an SoR application into one or more microapps, such as by developers of the application. In this case, if the administrator changes at least one value of the adjustable variables, the DPS can determine that the administrator opted to use custom logic for calculating MA scores. In some cases, the default logic can refer to a default equation used to calculate MA scores based on component details and custom MA point details provided by the administrator, and the custom logic can refer to adjusting the logic of the attributes used for the calculation (e.g., attribute weights or whether to use one or more design components or use case inputs).

At step 920, the administrator can input custom calculation logic in the MA builder (e.g., a part of the DPS or the microapp manager 308). For example, the administrator can provide a custom value for at least one of the adjustable variables listed in the developer console or the point calculation page within the workspace. The administrator can adjust the weight or multiplier of each MA attribute. For example, the values assigned to the weighted attribute can provide greater or less contribution towards the total calculated points. In some cases, the administrator can determine not to use one or more design components or use case inputs for calculating the score. For example, one or more attributes provided to the CAS may not be relevant for calculating MA points. Therefore, the administrator can filter at least one attribute from the calculation. After configuring the attributes or adjustable variables, step 924 can be executed.

At step 924, the CAS API can calculate MA points using either the default logic or custom logic. The CAS API can use the values of the design components and the use case inputs (e.g., generally referred to as MA attributes or adjustable variables) to calculate the scores/points. Subsequent to the calculation, the CAS can transmit the MA points to the MA builder. Further, the CAS can transmit the MA points to the workspace UI.

At step 928, the MA builder can receive the MA points from the CAS. The MA builder can assign the MA points to the MA having the attributes. In some cases, the MA builder can assign the MA points to one or more other microapps with similar attributes. The MA builder can transmit the MA attributes and the MA points to a machine learning model. The machine learning model can be trained with the input data. The machine learning model can determine or output a score for other microapps after receiving their attributes. At step 932, the workspace UI can receive MA points. For example, the workspace UI can display the MA points adjacent or on the MA associated with the calculated MA points. The workspace UI can send a signal to the CAS to request or confirm any update to the MA points respective to individual users. In some cases, the workspace UI can receive user activity data. The workspace UI can forward the user activity data to the CAS to incorporate user behavior information into MA points calculation. For example, the CAS can determine whether the score of microapps affects the adoption or usage of the microapp by a user. To encourage user adoption of one or more microapps, prioritize applications, or pre-launching applications, the CAS can increase or maintain the calculated MA points to increase the likelihood of the user launching the application.

Figure 10:
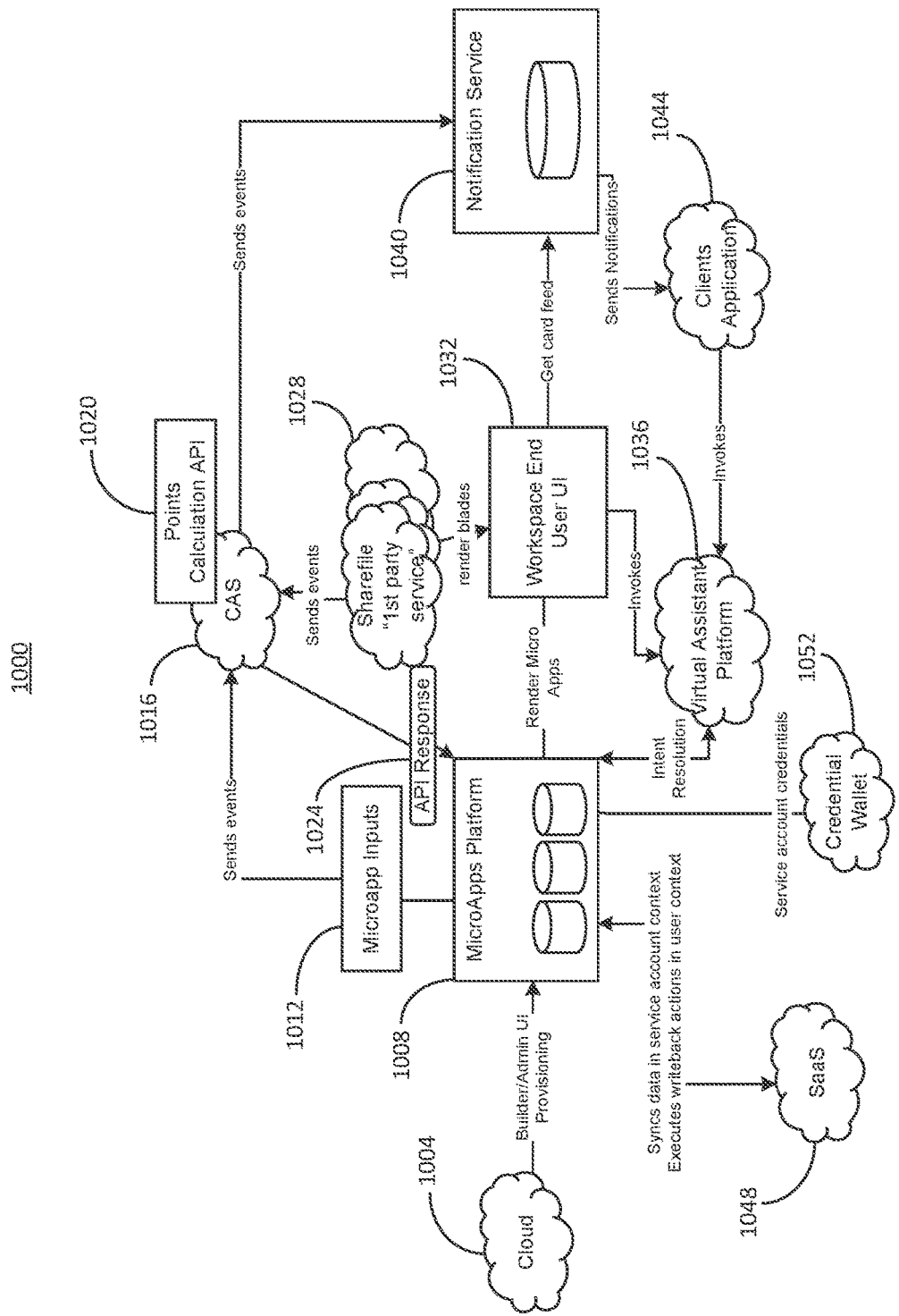
FIG. 10 is an example high-level architecture diagram, in accordance with one or more implementations.

FIG. 10 illustrates an example high-level architecture diagram, in accordance with one or more implementations. The example operations described in diagram 1000 can be executed, performed, or otherwise carried out by one or more components of the system 300 (e.g., DPS 301, network 302, client device(s) 303, or cloud 360), the computer 101, the cloud computing environment 214, or any other computing devices described herein in conjunction with FIGS. 1A-2C. The diagram 1000 can include communication paths between various devices and components to calculate MA points, assign MA points, prioritize applications, automatically launch applications, among other features and functionalities to enhance user engagement in microapps. The diagram 1000 can include at least one cloud 1004 (e.g., cloud 175 or cloud 360), at least one microapp platform 1008 (e.g., microapp builder), at least one microapp input 1012, at least one CAS 1016, at least one API 1020 which can be a part of the CAS 1016 (e.g., CAS API), at least one service 1028 (e.g., Sharefile "$1^{st}$ party service"), at least one workspace end user UI 1032, at least one virtual assistant platform 1036, at least one notification service 1040, at least one client application 1044, at least one SaaS 1048 (e.g., SaaS platform or application), and at least one credential wallet 1052. The architectural components listed above can communicate to each other in the form of events and Application Programming Interfaces ("APIs").

The cloud 1004 can provision or transmit the builder UI (or administrator UI) to the MA platform 1008. The builder UI can include MA attributes as described above, including at least design components and use case inputs for configuration by the administrator. The SaaS application 1048 can communicate with the MA platform 1008. The SaaS application 1048 can sync data in service account context with the MA platform 1008 and execute writeback actions in user context. The writeback actions can include user interactions within the MA or administrator MA settings while using the MA platform 1008. The credential wallet 1052 can communicate with the MA platform 1008 to receive or provide user credentials. The MA platform 1008 can refer to the credential wallet 1052 to determine whether the client device has access to a user account based on their credential information.

The events described herein can be generated when a new MA is deployed in the MA builder to the CAS 1016 with the details of the physical design components and nature of the MA (e.g., use case inputs). The MA platform 1008 can transmit microapp inputs 1012 to the CAS 1016 (e.g., send events). Microapp inputs 1012 can include at least attributes of the microapp. The CAS API 1020 can use the MA inputs to calculate or otherwise determine MA points. The API 1020 can take into account the inputs 1012 from the event and the customization inputs from the administrator sent via an API request, for example. The API 1020 can use at least the default logic or custom logic or rules to calculate or determine the MA points. The CAS 1016 can respond to the MA platform 1008 providing the MA inputs 1012 with an API response 1024. The API response 1024 can include the calculated MA points associated with an MA having the attributes used for calculation. The MA platform 1008 can assign the calculated MA points to the MA or other associated MA with similar attributes, for example. The CAS 1016 can receive event data from the service 1028. The service 1028 can perform features and functionalities of a sharefile service. The event data from the service 1028 can include real-time tracking, feedback, request/approval, or other user activities within the microapp. The CAS 1016 can determine launch activities, session activities, or other user activities in the microapp based on the event data. The CAS 1016 can transmit events to the notification service 1040, such as MA points calculated. The notification service 1040 can send a notification to the client application 1044 to display the MA points calculated by the CAS 1016. Further, the CAS 1016 can handle end-user score and analytics to provide MA points reflecting the MA inputs 1012.

The communication between the CAS 1016 and the workspace end-user UI 1032 (e.g., generally referred to as UI 1032) can be done as events and blade rendering (e.g., at the service 1028). The service 1028 can include or be a part of a blade renderer, such as a computing device for rendering images. The service 1028 can provide a rendering of an interface to the UI 1032. The UI 1032 can communicate with the MA platform 1008 to render microapps within the workspace for display on a client device. The UI 1032 can request a card feed from the notification service 1040. The card feed can refer to a template, a card, or an interface including contents for display on the user interface. For example, the UI 1032 can request a feed or content from the notification service 1040 to display a user interface for the client application 1044 running the workspace platform. In some cases, the notification service 1040 can use the card design provided by the UI 1032 to send the notification with the design to the client application 1044.

The client application 1044 and the UI 1032 can invoke the virtual assistant platform ("VAP") 1036. The VAP 1036 can provide remote assistant or services to one or more users, devices, or components. The VAP 1036 can be in communication with the MA platform 1008, such as to provide users with feedback or answers to resolve issues within the workspace platform. For example, a user can communicate with the VAP 1036 using the client application 1044 accessing the workspace. The user can submit tickets, feedback, or issues to the VAP 1036. The VAP 1036 can provide a resolution through the MA platform 1008 can render the resolution to the user via the UI 1032. The UI 1032 can invoke the VAP 1036 responsive to the user request for virtual assistance (e.g., user interaction with a virtual assistant icon) presented in the UI. Therefore, MA platform 1008 can present an interface to the client device having at least the microapps, scores of the microapps, one or more notifications, and a virtual assistant icon (e.g., for resolving issues with the workspace). The MA platform 1008 can receive inputs (e.g., events or activities) from the user accessing the workspace via the client application 1044.

Figure 11:
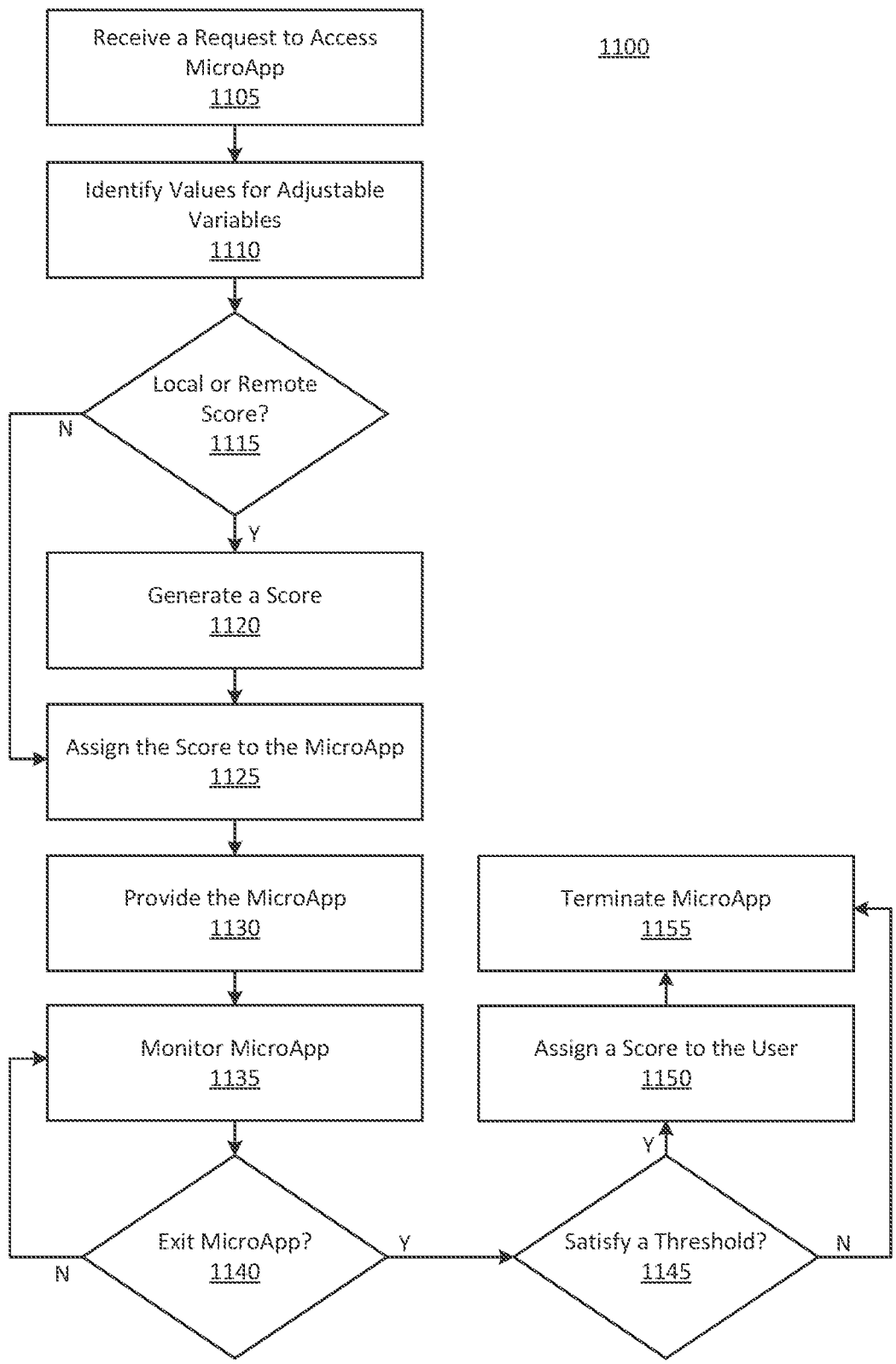
FIG. 11 is an example flow diagram of a method to implement microapps within digital workspaces, in accordance with one or more implementations.

FIG. 11 illustrates an example flow diagram of a method for enhancing user engagement with micro applications. The example method 1100 can be executed, performed, or otherwise carried out by one or more components of the system 300 (e.g., DPS 301, network 302, client device(s) 303, or cloud 360), the computer 101, the cloud computing environment 214, or any other computing devices described herein in conjunction with FIGS. 1A-2C. The method 1100 can include receiving, by a DPS (e.g., DPS 301) a request to access the microapp, at ACT 1105. At ACT 1110, the DPS can identify values for adjustable variables (or attributes). At ACT 1115, the DPS can determine whether to use a local or remote score. At ACT 1120, the DPS can generate a score. At ACT 1125, the DPS can assign the score to the microapp. At ACT 1130, the DPS can provide the microapp to the client device. At ACT 1135, the DPS can monitor activities in the microapp. At ACT 1140, the DPS can determine whether to exit the microapp. At ACT 1145, the DPS can determine whether the one or more activities of the user satisfy a threshold of the microapp. At ACT 1150, the DPS can assign a score to the user. At ACT 1155, the DPS can terminate the microapp.

Still referring to FIG. 11 in further detail, at ACT 1105, the DPS can receive a request from the client device (e.g., a user of a workspace platform) to access a microapp. The DPS can receive the request via a network interface in communication with a client device. The network interface can be in communication with other devices, such as a remote server, remote computing environment, or other client devices. The DPS can be in communication with one or more computing systems of record (e.g., SoR) to execute the microapp. The DPS can proceed to ACT 1110 after or responsive to receiving the request. The DPS can receive the request responsive to the client device transmitting an indication of interaction with a microapp displayed in the workspace UI.

In some cases, the DPS can receive an indication of an action to be completed with the use of a micro application. The action can refer to a task or objective to be completed or performed by the user. The DPS can receive the indication from an administrator. For example, the administrator can provide an indication that a task or objective in a microapp is urgent, increase the business value for completing a task, or receive a notification to complete a task in the microapp. The indication of the action can be based on a countdown or a timer indicating that the task or objective is about to be due (e.g., within an hour, a day, etc.) Accordingly, the DPS can proceed to ACT 1110 to identify the values for microapp attributes.

At ACT 1110, the DPS can identify the values for one or more adjustable variables. The adjustable variables can be referred to as the attributes of the microapp, such as design components and use case inputs. The DPS can set the values based on inputs from the administrator or developer of the workspace platform. In some cases, the DPS can set the values for each attribute based on an output from a machine learning model (e.g., trained using at least the historical microapp attributes, historical activity data, etc.).

For example, before the client device requests access to the microapp, the DPS can provide an interface including at least the one or more attributes for the microapp to the client device. In this case, the client device can be an administrator device accessing the administrator account to edit the application information or adjust the values of the attributes. The DPS can receive the values for the one or more attributes of the microapp. The DPS can store the values provided by the administrator in the data repository. For example, the DPS can identify or retrieve the values from the data repository to perform score calculation to assign to the microapp when other client devices transmit a request to access the microapp.

In some cases, the DPS can generate the values for the one or more attributes for the micro application based on a log of historical use of the micro application by one or more client devices. The log of historical use can refer to any historical data or recorded data of users' activities with the microapp. The log of historical use can include at least the duration of use, average transaction per day (e.g., week, month, etc.), objectives completed during a transaction, time of day accessing the application, or other indication of usage. The transaction can refer to users launching, accessing, or using the application. In some cases, the DPS can use a machine learning model to determine a usage pattern, user behavior, or activities performed in the application. Depending on at least one of business impact, time-save per transaction (e.g., how much time saved from using the microapp from source app), adoption rate, user relevance, or expected user effort, the DPS can increase or decrease the values of at least one attribute to encourage users to adopt the application. For example, with high business impact, high time-save per transaction, and low adoption rate, the DPS can increase the values of one or more attributes to increase the microapp score that will be calculated, thereby increasing the adoption rate or total users that adopted the application for daily use. In some cases, the DPS can decrease the microapp score for microapps that have been adopted, overused (e.g., for farming scores), or to reflect the business impact, user effort, among other attributes.

In some cases, the DPS can generate or identify the values for the attributes at a first time for a first user. The DPS can identify the values for the attributes at a second time for a second user. The first time and second time may be instants in time and/or may be separate periods of time, and accordingly the "first time" or "second time" may refer to time periods of seconds, minutes, or any other such time. The first time and second time may be entirely separate or disjoint, or may be overlapping (e.g. a first time from 12:00:00 to 12:00:10, and a second time from 12:00:09 to 12:00:15). The DPS can proceed to ACT 1115. Based on the time accessing the application, the DPS can assign different scores for each of the first user and the second user.

At ACT 1115, the DPS can determine whether to use a local or remote score. The local score can refer to scores that are stored locally, such as on the DPS. The remote score can refer to scores that are stored remotely, such as on the remote computing environment or other servers. In some cases, when determining to use the remote score, the DPS can proceed to ACT 1120, thereby generating a score for the microapp. If a score is previously assigned to the microapp, the generated score can be different or similar to the previous score, depending on at least the time the user accessed the microapp, the current time of the user within the microapp, or changes in the values of the microapp attributes. If the DPS use a local score, the DPS can proceed to retrieve the score from the data repository. The retrieved score can be associated with the same microapp or other microapps with similar attributes (e.g., when used to calculate the score).

At ACT 1120, the DPS can generate a score associated with the microapp. The DPS can generate the score based on the values for the one or more adjustable variables for the micro application. The DPS can be a part of or include the analytics service and the API to calculate the score. The DPS can use either default logic or custom logic for the calculation. For example, the DPS can sum the values of a first set of attributes (e.g., the design components) and sum the values of a second set of attributes (e.g., use case inputs). The DPS can multiply the sum of the first set with the sum of the second set. After obtaining a result, the DPS can scale the total values to determine the score. For example, values equal to or between 0-5 can be assigned a score of 1, equal or between 6-10 can be assigned a score of 2, etc. Other scales can be used for determining the score. The DPS can cap the maximum score per microapp, for example, based on a predetermined value from the administrator, such as 10, 15, or 20. After calculating the score, the DPS can proceed to ACT 1125.

In some cases, the DPS can generate a second score associated with the microapp at a second time. For example, the DPS can generate a score for a second user requesting the microapp having the same attributes as the first. The DPS can determine that the time remaining to complete one or more objectives within the microapp is less than a threshold at a second time (e.g., 5 hours remaining at a first time and less than 2 hours remaining at a second time). Based on the remaining time, the DPS can generate the second score different from the score generated at the first time. The DPS can generate a lower score at a second time than the first time, as a penalty for starting/finishing the objective later than the client device at a first time. Accordingly, the second client device requesting the application at a second time can be encouraged to complete the task earlier or adopt the application quicker. In another case, the DPS can increase the score for the microapp at a second time to encourage the user to complete the task before running over the remaining time. In some cases, the DPS can set a limited time point increase for one or more microapps to encourage one or more users to access and perform activities/objectives within the applications.

In some cases, the DPS can generate a corresponding subscore for one or more attributes of the microapp. For example, the values of the attributes can be directly associated with or otherwise assigned a score. Therefore, the DPS can sum or multiple one or more values of the attributes to determine the microapp score. In some cases, the DPS can train a machine learning model from a log of historical use of the micro application. The log of historical use can be from various client devices. The DPS can determine, by using the machine learning model, a weight associated with one or more attributes. The DPS can take into account one or more weight attributes heavily than other attributes to calculate the score. The DPS can generate a score associated with the microapp based on the weight of the one or more adjustable variables. For example, the DPS can generate a score that further reflects the value of one or more specific attributes. If the value of the specific attributes is high, the DPS can generate a high microapp score, or vice versa.

At ACT 1125, the DPS can assign or otherwise associate the generated score to the microapp. The DPS can assign the score to the microapp specific to each user/account/client device. For example, if a second client device requests to access the microapp, the DPS can generate and assign the second score to the microapp on the workspace platform executing on the second client device. The second score can be different from scores for other client devices. In some cases, the second score can be similar to the microapp scores for other client devices. When assigning the score, the DPS can provide the score to the client device for display within the workspace interface (e.g., user interface). The DPS can show the score with the microapp icons, frame, link, or portion on the user interface. In some cases, for administrator requesting to assign a microapp score, the DPS can provide the score for display within the user interface, which can indicate that the score is provided to the microapp. The DPS can provide the score for display responsive to at least an adjustment of values of at least one attribute, interacting with an interactive element to calculate the score, or when saving the configuration of the values. The DPS can proceed to ACT 1130 to initiate the action (e.g., tasks or objectives) with the use of the microapp.

At ACT 1130, the DPS can provide the microapp to the client device. The DPS can launch the microapp in a new window or tab in the workspace. The microapp may already be executing in the background of the workspace (e.g., in a background window or with disabled visibility). In this case, the DPS can bring forward the background window having the microapp interface or enable visibility of the microapp. The microapp can have similar look or feel to the source application (e.g., similar theme, color, actionable buttons, etc.). In some cases, the DPS can calculate the scores before receiving the request to access the microapp (e.g., when integrating the source application into the workspace). Therefore, the DPS can provide or launch the microapp responsive to receiving the request for the microapp, for example, 10 ms, 50 ms, or 100 ms after receiving the request.

In some cases, the DPS can provide a different action, objective, or task within the microapp for a second client device to complete. For example, the DPS can provide the first client device with a first objective to complete within the microapp. The DPS can provide the second client device with a second objective to complete within the microapp. Based on at least one of the user effort, the complexity of the different objectives, or the expected time to complete the objectives, the DPS can assign more scores to the objectives with higher complexity level and time consumption. In some cases, the generated score can be for both the first objective and the second objective. The first client device and the second client device can access a shared microapp, where the tasks can be shared and completed together. Therefore, the DPS can provide scores to each client device based on individual performance, effort, and quality of work.

In some cases, the DPS can pre-store launch data for the microapp based on the score assigned to the microapp. For example, the client device can access the workspace with various microapps with scores. The DPS can sort or suggest microapps based on the scores. The DPS can use the score as a part of prioritizing one or more microapps. The DPS can predict, using the machine learning model, one or more applications the user is likely to launch based on at least one of the microapp scores, historical user activities or behavior, relevancy of microapp, or other microapps attributes and user information. Based on the prediction, the DPS can automatically launch the application or retrieve data in preparation to launch the microapp. Thus, the DPS can prioritize microapps, increase the efficiency of launching applications, increase application access time, avoid false launches of applications, enhance workspace user experience, increase productivity, and decrease resource consumption by prioritizing tasks for users to complete.

At ACT 1135, the DPS can monitor one or more activities performed by the client device in the microapp. The activities can include any action or interaction the client device performed in the microapp. In some cases, the activities can include an absence of any action or interaction from the client device, which can indicate that the user is idled. The activities can include completing at least one of various objectives within the microapp. From the monitored actions, the DPS can proceed to ACT 1140 and ACT 1145. The DPS can transmit the activities of the user to a machine learning model or behavior analysis system to determine at least user effort, engagement level, or other indications of user behavior. The DPS can store the user activities as historical user activities for use to determine the microapp score, such as for other users/accounts or account types.

At ACT 1140, the DPS can determine whether to exit the microapp. For example, the DPS can receive a request from the client device to terminate the microapp (or session of the microapp). The client device can click on an exit icon within the interface of the microapp to request the termination. In some cases, the DPS can notify the user of any unsaved items. The DPS can provide a pop-up box for the client device to confirm whether to close without saving the items. Responsive to the confirmation, the DPS can terminate the microapp. The DPS can terminate the microapp responsive to a timeout or countdown. For example, the DPS can determine that the client device is idled beyond a timeout or countdown period (e.g., a predetermined period of time by the administrator, such as 1 hour, 2 hours, etc.). Responsive to the determination, the DPS can terminate the microapp. The DPS can prompt the client device at least once before terminating the microapp (e.g., confirming whether the user is present).

In some cases, the DPS can receive a request from the client device to terminate or close the workspace. Terminating the workspace can exit all microapps active in the workspace. In some cases, closing the workspace may not terminate the applications running on the remote computing environment. For example, responsive to receiving a request to terminate the microapp, the DPS can disable the workspace interface for the client device without terminating the workspace session. In this case, the DPS can terminate the workspace session responsive to a timeout. In further example, if the client device re-access the workspace prior to the timeout, the DPS can provide the same session to the client device. If the DPS determines not to exit the microapp, the DPS can proceed to ACT 1135. If the DPS determines to exit the microapp, the DPS can proceed to ACT 1145. In some cases, without exiting the microapp, the DPS can perform features similar to ACT 1145 or ACT 1150 to determine the score for the user.

At ACT 1145, the DPS can determine whether the one or more activities performed by the client device (e.g., by the user) satisfy a threshold (e.g., an activity threshold) of the microapp. For example, the DPS can determine that the client device completed an objective or action within the microapp, where the objective or action can refer to an activity threshold set by the DPS. The DPS can then proceed to ACT 1150. In some cases, the DPS can determine that the one or more activities performed by the client device do not satisfy the threshold (e.g., the objective or task was not completed). As such, the DPS can proceed to ACT 1155. The DPS can notify the client device whether at least one objective or action was completed during the activities within the microapp. For example, the DPS can transmit a notification indicating that the client device either did or did not complete one or more objectives or actions. If completed, the DPS can provide a notification that the client device gained at least a portion of the microapp score. If not completed, the DPS can provide a notification indicating that the client device did not obtain at least a portion of the generated score.

The DPS can identify multiple activity thresholds for the microapp. For example, the microapp can include multiple thresholds (e.g., three objectives, three tasks, or three portions of a single objective/task). The activity thresholds can be associated with a score based on a sum of subscores of the one or more attributes associated with corresponding activities performed with the micro application. For example, the DPS can calculate a first score based on values from a first set of attributes to assign for a first activity threshold, a second score based on values from a second set of attributes to assign for a second activity threshold, etc. The DPS can determine whether the activities performed by the client device satisfy at least one of the activity thresholds. If at least one is satisfied, the DPS can proceed to ACT 1150. If not, the DPS can proceed to ACT 1155. In some cases, if no command was issued for terminating the microapp, the DPS can revert or loop to ACT 1135 to further monitor the client device activities.

At ACT 1150, the DPS can assign or provide at least a portion of the generated score to the client device. By providing the score to the client device, the DPS can increase the score counter associated with the user account. For example, the DPS can increment a counter associated with the user account by at least a portion of the generated score for the microapp. The counter can be displayed within the user interface in the workspace. The DPS can provide the score responsive to the client device satisfying at least one activity threshold. In the case of multiple activity thresholds, the DPS can provide one or more portions of the generated score to the client device based on the points associated with individual thresholds (e.g., activity thresholds). Activity thresholds may not be associated with the portion of the total score. For example, the DPS can determine that a first objective (e.g., first activity threshold) can be accomplished with less user effort than a second objective (e.g., second activity threshold). Therefore, the DPS can assign a greater portion of the generated score to the first activity threshold than to the second activity threshold. Accordingly, the DPS can provide a score associated with an activity threshold to the client device or user account performing activities with the microapp satisfying the activity threshold. The DPS can proceed to ACT 1155 after providing the score to the client device.

At ACT 1155, the DPS can terminate the microapp. The DPS can terminate the microapp subsequent to a timeout or a request from the client device to terminate the microapp session. The DPS can terminate the microapp after providing at least a portion of the generated score to the client device. After terminating the microapp, the DPS can display the workspace interface to the client device. The DPS can display a notification indicating how many points are earned by the client device using the microapp. In some cases, the DPS may not present a notification indicating the earned point, such as based on the workspace setting by the client device or if the client device did not earn any point. After terminating the microapp, the DPS can present an interface indicating one or more incomplete objectives and remaining points that the client device can obtain from the microapp. The presented interface can include objectives completed, points earned per objective, and total points earned during the use of the microapp.

In some cases, the DPS can identify a score for individual client devices. The DPS can generate a list of the client devices in order (or ranking) according to their respective scores. For example, within the leaderboard or ranking page of the workspace, the DPS can display the top scorer within the workspace or institution managing the workspace. The ranking can be based on the accumulated scores. In some cases, the ranking can be sorted based on activities within each microapp (e.g., leader for each microapp), time spent in the workspace, leader in idling within the workspace/microapps, among other ranking themes/schemes. The DPS can generate the list with client device identifiers, names associated with user accounts, usernames, or as anonymous entities based on the setting of the users. In view of the aforementioned systems, methods, and apparatus, the technical solution described above can enhance user engagement with microapps, increase the efficiency of launching microapps using point-scoring features, decrease resource consumption for the workspace via prioritization of a microapp for the user to complete, enhance predictive capabilities as to which microapp the user is likely to launch, improve access time (e.g., speed to access applications), and decrease false instantiation of applications users may not access.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method for enhancing user engagement with micro applications, comprising:
   receiving, by a computing device comprising one or more processors and memory, an indication of an action to be completed with use of a micro application, the computing device in communication with a client device and one or more computing systems of record to execute the micro application;
   identifying, by the computing device, values for one or more attributes of the micro application;
   generating, by the computing device, based on the identified values, a score for the micro application;
   providing, by the computing device, the score to the client device for display within a user interface, the user interface configured to initiate the action with use of the micro application;
   receiving, by the computing device from the client device, a request to terminate the micro application;
   determining, by the computing device, that activities performed by the client device with the micro application do not satisfy an activity threshold for the micro application; and
   transmitting, by the computing device responsive to the determination, a notification indicating that the client device did not obtain at least a portion of the generated score for the micro application.

2. The method of claim 1, further comprising:
monitoring, by the computing device, use of the micro application for an activity of the client device;
determining, by the computing device, that the activity of the client device with the micro application satisfies an activity threshold; and
incrementing, by the computing device, responsive to satisfying the activity threshold, a counter displayed within the user interface by the generated score for the micro application.

3. The method of claim 1, wherein identifying values for the one or more attributes of the micro application further comprises:
providing, by the computing device, to the client device, an interface comprising the one or more attributes for the micro application; and
receiving, by the computing device from the client device, the values for the one or more attributes of the micro application.

4. The method of claim 1, wherein identifying values for the one or more attributes of the micro application further comprises:
generating, by the computing device, the values for the one or more attributes for the micro application based on a log of historical use of the micro application by one or more client devices.

5. The method of claim 4, wherein generating the values for the one or more attributes and generating the score for the micro application is performed at a first time, and further comprising:
receiving, by the computing device, a request from a second client device to access the micro application;
generating, by the computing device at a second time, values for the one or more attributes for the micro application, at least one of the values generated at the second time different from at least one of the corresponding values generated at the first time;
generating, by the computing device at the second time, a second score for the micro application, the second score different from the score generated at the first time; and
providing, by the computing device, the generated second score to the second client device for display within a second user interface of the second client device.

6. The method of claim 1, further comprising:
generating, by the computing device, a corresponding subscore for each of the one or more attributes of the micro application; and
identifying, by the computing device, a plurality of activity thresholds, each activity threshold associated with a score based on a sum of subscores of the one or more attributes associated with corresponding activities performed with the micro application;
wherein a score associated with an activity threshold is provided to the client device performing activities with the micro application satisfying the activity threshold.

7. The method of claim 1, further comprising:
identifying, by the computing device, a score for each client device of a plurality of client devices; and
generating, by the computing device, a list of the plurality of client devices in order according to their respective scores.

8. The method of claim 1, wherein generating the score associated with the micro application further comprises:
training, by the computing device, a machine learning model from a log of historical use of the micro application by one or more client devices and respective scores for the one or more client devices;
determining, by the computing device, using the machine learning model, a weight associated with each of the one or more attributes; and
generating, by the computing device based on the weight of each of the one or more attributes, the score associated with the micro application.

9. A system for enhancing user engagement with micro applications, the system comprising:
one or more processors and memory in communication with a client device and one or more computing systems of record to execute the micro application, wherein the one or more processors are configured to:
receive an indication of an action to be completed with use of a micro application;
identify values for one or more attributes of the micro application;
generate, based on the identified values, a score for the micro application;
provide the score to the client device for display within a user interface, the user interface configured to initiate the action with use of the micro application;
receive a request to terminate the micro application;
determine that activities performed by the client device with the micro application do not satisfy an activity threshold for the micro application; and
transmit, responsive to the determination, a notification indicating that the client device did not obtain the generated score for the micro application.

10. The system of claim 9, wherein the one or more processors are further configured to:
monitor the use of the micro application for an activity of the client device;
determine that the activity of the client device with the micro application satisfies an activity threshold; and
increment, responsive to satisfying the activity threshold, a counter displayed within the user interface by the generated score for the micro application.

11. The system of claim 9, wherein the one or more processors are further configured to:
provide, to the client device, an interface comprising the one or more attributes for the micro application; and
receive, from the client device, the values for the one or more attributes of the micro application.

12. The system of claim 9, wherein the one or more processors are further configured to:
generate the values for the one or more attributes for the micro application based on a log of historical use of the micro application by one or more client devices.

13. The system of claim 12, wherein generating the values for the one or more attributes and generating the score for the micro application is performed at a first time, and wherein the one or more processors are further configured to:
receive a request from a second client device to access the micro application;
generate, at a second time, values for the one or more attributes for the micro application, at least one of the values generated at the second time different from at least one of the corresponding values generated at the first time;
generate, at the second time, a second score for the micro application, the second score different from the score generated at the first time; and
provide the generated second score to the second client device for display within a second user interface of the second client device, the second user interface configured to initiate a different action with use of the micro application.

14. The system of claim 9, wherein the one or more processors are further configured to:
   generate a corresponding subscore for each of the one or more attributes of the micro application; and
   identify a plurality of activity thresholds, each activity threshold associated with a score based on a sum of subscores of the one or more attributes associated with corresponding activities performed with the micro application;
   wherein a score associated with an activity threshold is provided to the client device performing activities with the micro application satisfying the activity threshold.

15. The system of claim 9, wherein the one or more processors are further configured to:
   identify a score for each client device of a plurality of client devices; and
   generate a list of the plurality of client devices in order according to their respective scores.

16. The system of claim 9, wherein the one or more processors are further configured to:
   train a machine learning model from a log of historical use of the micro application by one or more client devices and respective scores for the one or more client devices;
   determine, using the machine learning model, a weight associated with each of the one or more attributes; and
   generate, based on the weight of each of the one or more attributes, the score associated with the micro application.

17. A non-transitory computer-readable medium comprising instructions that, when executed by a processor of a computing device, cause the computing device to perform actions comprising:
   receiving an indication of an action to be completed with use of a micro application, the computing device in communication with a client device and one or more computing systems of record to execute the micro application;
   identifying values for one or more attributes of the micro application;
   generating, based on the identified values, a score for the micro application;
   providing, the score to the client device for display within a user interface, the user interface configured to initiate the action with use of the micro application;
   receiving, by the computing device from the client device, a request to terminate the micro application;
   determining, by the computing device, that activities performed by the client device with the micro application do not satisfy an activity threshold for the micro application; and
   transmitting, by the computing device responsive to the determination, a notification indicating that the client device did not obtain at least a portion of the generated score for the micro application.

18. The non-transitory computer-readable medium of claim 17, wherein the instructions further comprise instructions to:
   monitor the use of the micro application for an activity of the client device;
   determine that the activity of the client device with the micro application satisfies an activity threshold; and
   increment, responsive to satisfying the activity threshold, a counter displayed within the user interface by the generated score for the micro application.

* * * * *